(12) United States Patent
Gardiner

(10) Patent No.: US 10,161,585 B2
(45) Date of Patent: Dec. 25, 2018

(54) LOUVER ASSEMBLY

(71) Applicant: SerraLux Inc., Los Gatos, CA (US)

(72) Inventor: Mark E Gardiner, Santa Rosa, CA (US)

(73) Assignee: SERRALUX INC., Los Gatos, CA (US)

( * ) Notice: Subject to any disclaimer, the term of this patent is extended or adjusted under 35 U.S.C. 154(b) by 65 days.

(21) Appl. No.: 15/160,637

(22) Filed: May 20, 2016

(65) Prior Publication Data

US 2016/0341383 A1 Nov. 24, 2016

Related U.S. Application Data

(60) Provisional application No. 62/164,834, filed on May 21, 2015.

(51) Int. Cl.
*F21S 11/00* (2006.01)
*G02B 19/00* (2006.01)

(52) U.S. Cl.
CPC ........... *F21S 11/007* (2013.01); *F21S 11/002* (2013.01); *G02B 19/0019* (2013.01); *G02B 19/0042* (2013.01); *G02B 2207/123* (2013.01)

(58) Field of Classification Search
CPC ... F21S 11/002; F21S 11/007; G02B 19/0019; G02B 19/0042
USPC ........................................................ 359/596
See application file for complete search history.

(56) References Cited

U.S. PATENT DOCUMENTS

| | | |
|---|---|---|
| 3,031,151 A | 4/1962 | McIvaine |
| 4,226,051 A | 10/1980 | Thompson |
| 4,509,825 A | 4/1985 | Otto et al. |
| 4,773,733 A | 9/1988 | Murphy |
| 4,883,340 A | 11/1989 | Dominguez |
| 4,989,952 A | 2/1991 | Edmonds |
| 5,142,133 A | 8/1992 | Kern et al. |
| 5,461,496 A | 10/1995 | Kanada et al. |
| 5,731,900 A | 3/1998 | Milner |
| 5,880,886 A | 3/1999 | Milner |
| 5,999,323 A | 12/1999 | Wood |
| 6,435,683 B1 | 8/2002 | Milner |
| 6,616,285 B2 | 9/2003 | Milner |
| 6,980,728 B2 | 12/2005 | Ladstätter et al. |
| 7,389,609 B2 | 6/2008 | Yorgason |

(Continued)

FOREIGN PATENT DOCUMENTS

| | | |
|---|---|---|
| JP | 5-52076 A | 3/1991 |
| WO | 1997031276 A1 | 8/1997 |

(Continued)

OTHER PUBLICATIONS

PCT International Search report and written opinion of patentability in PCT/US2015/045674.

(Continued)

*Primary Examiner* — Christopher E Mahoney
(74) *Attorney, Agent, or Firm* — Edward S. Sherman

(57) ABSTRACT

A generally plano rectangular louvers are capable of being ganged in a stacked tiltable array to enhance light redirection when titled to follow the solar elevation. Combinations of features and optical characteristic avoid optical artifacts and enhance efficiency of light utilization and manufacturing. Different louvers can be combined in alternative ways in such arrays.

6 Claims, 26 Drawing Sheets

(56) References Cited

U.S. PATENT DOCUMENTS

| | | | |
|---|---|---|---|
| 7,742,230 B2 * | 6/2010 | Uchida | G02B 5/0236 |
| | | | 359/443 |
| 8,365,800 B2 | 2/2013 | Oh et al. | |
| 8,520,305 B2 | 8/2013 | Suzuki et al. | |
| 8,873,146 B2 | 10/2014 | Gardiner | |
| 9,341,334 B2 * | 5/2016 | Fujioka | F21S 11/007 |
| 9,863,593 B2 * | 1/2018 | Sakuragi | F21S 11/007 |
| 2003/0127197 A1 | 7/2003 | Lai | |
| 2004/0253456 A1 | 12/2004 | Braybrook | |
| 2005/0056382 A1 | 3/2005 | Khajavi | |
| 2008/0202703 A1 | 8/2008 | Edmonds | |
| 2008/0271378 A1 | 11/2008 | Le et al. | |
| 2009/0009870 A1 | 1/2009 | Usami | |
| 2011/0043919 A1 | 2/2011 | Ko | |
| 2012/0033302 A1 | 2/2012 | Suzuki et al. | |
| 2012/0168070 A1 | 7/2012 | Nelson et al. | |
| 2013/0042982 A1 | 2/2013 | Zhang | |
| 2013/0087294 A1 | 4/2013 | Khajavi | |
| 2013/0265642 A1 | 10/2013 | Vasylyev | |
| 2014/0049983 A1 | 2/2014 | Nichol et al. | |
| 2014/0055859 A1 | 2/2014 | Vasylyev | |
| 2014/0104689 A1 | 4/2014 | Padiyath et al. | |
| 2014/0211331 A1 | 7/2014 | Padiyath et al. | |
| 2015/0226394 A1 | 8/2015 | Ueki | |
| 2016/0178164 A1 | 6/2016 | Nishida | |
| 2016/0186949 A1 | 6/2016 | Sekido et al. | |

FOREIGN PATENT DOCUMENTS

| | | | | |
|---|---|---|---|---|
| WO | 2014078812 A1 | 5/2014 | | |
| WO | WO 2014078812 A1 * | 5/2014 | | E06B 9/24 |

OTHER PUBLICATIONS

PCT International Search report and written opinion of patentability in PCT/US2016/033637.

PCT International Search report and written opinion of patentability in PCT/US2015/049531.

PCT International Search report and written opinion of patentability in PCT/US2015/049530.

* cited by examiner

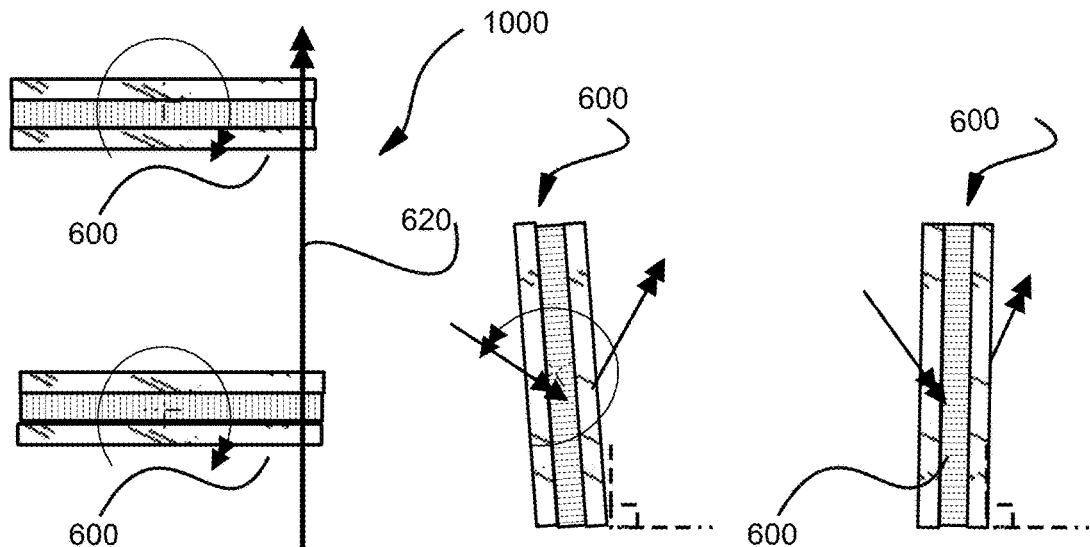
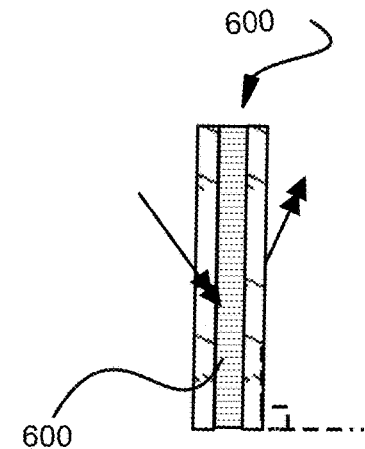
FIG. 3C
FIG. 3B
FIG. 3A
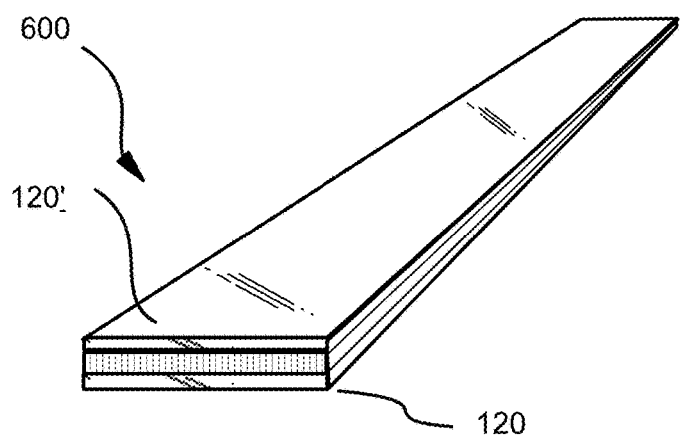
FIG. 3D

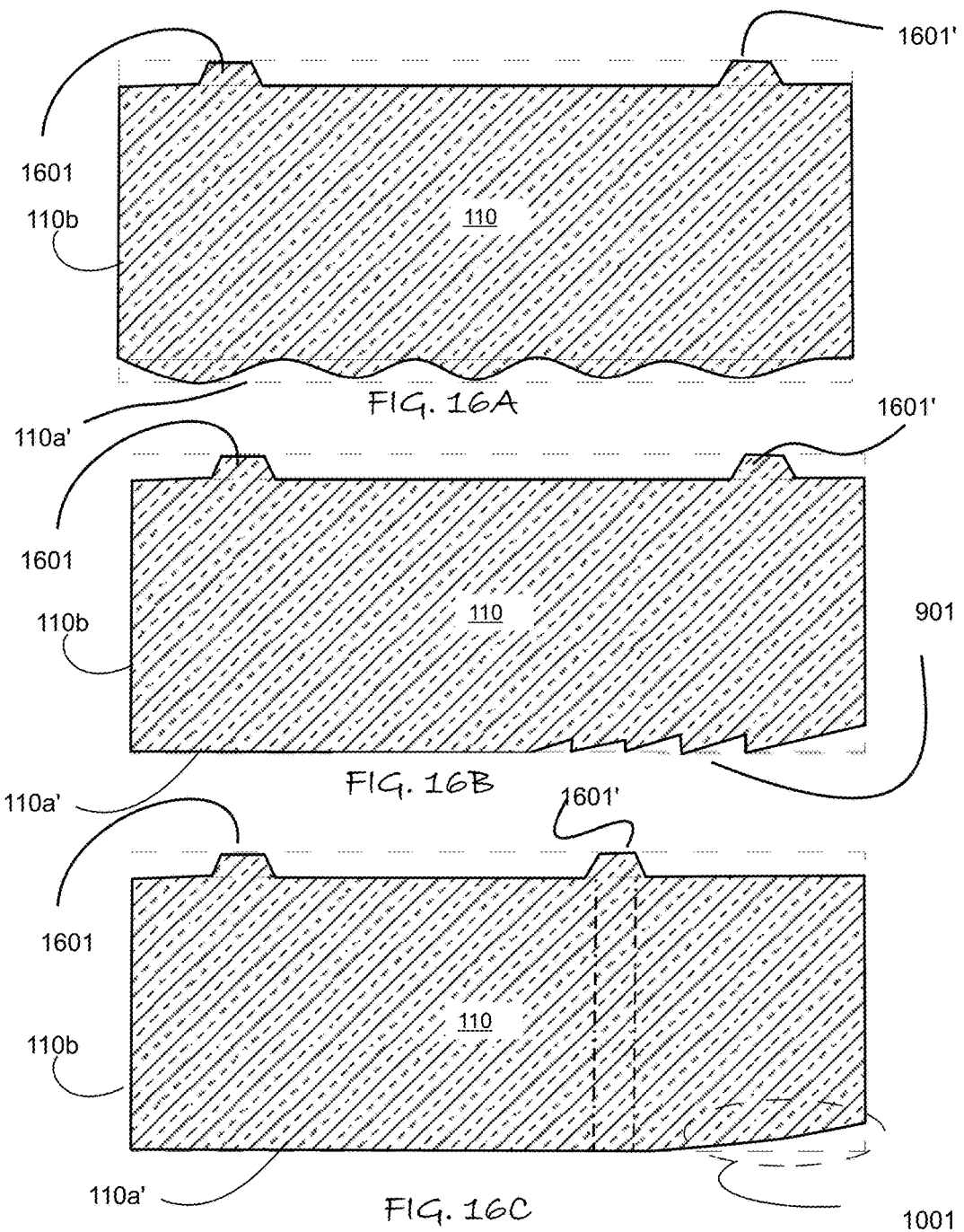

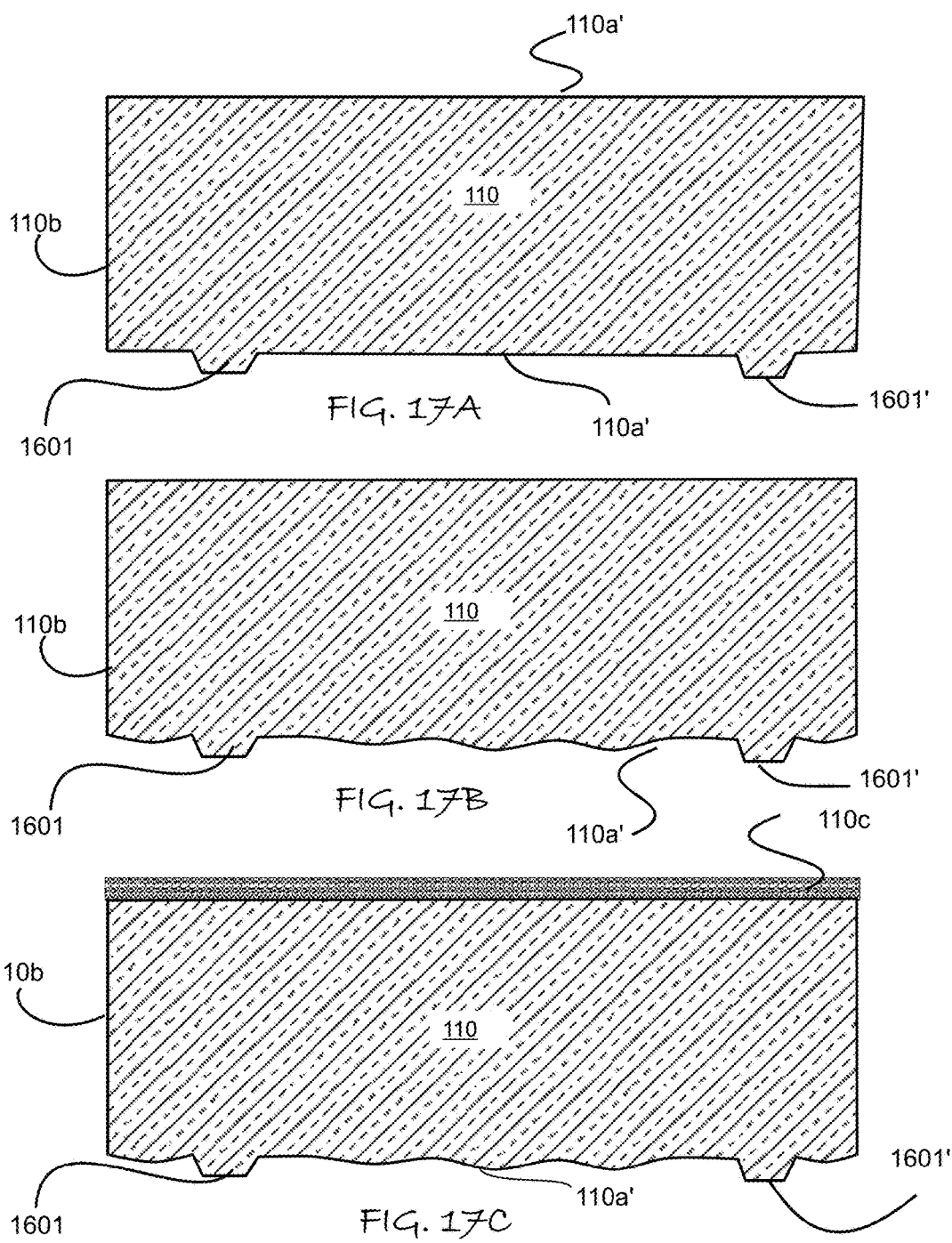

LOUVER ASSEMBLY

CROSS REFERENCE TO RELATED APPLICATIONS

The present application claims the benefit of priority the US provisional patent application of the same title that was filed on May 21, 2015, having application No. 62/164,834, and is incorporated herein by reference.

BACKGROUND OF INVENTION

The field of invention is light re-directing structure suitable for use with exterior glazing to selectively enhance the penetration of exterior light within an interior space.

Such light directing structures are well known and rely primarily on total internal reflection (TIR) of solar radiation, which has the highest angle of incidence on the glazing surfaces near noon time. A planar transparent member (which can either form a glazing surface or is mounted parallel to a glazing surface) can re-direct light that would otherwise only reach the floor closest to the glazing. High angle incident light, rather than being transmitted directly toward the floor close to a window, is re-directed upward toward the ceiling so that it then scatters distal from the window, resulting in a farther penetration of natural light into the interior rooms of the structure.

It should be readily appreciated that controlling the re-directed angle allows for greater penetration of re-directed light, as the light incident at high angle near noon time, would be directed toward the ceiling rather than the floor, where it would be scattered to provide natural diffuse light from above, rather than glare from a polished or specular floor surface or absorbed by the floor (where it would not contribute to the illumination of work surfaces), and hence permit the minimization of the use of artificial lighting, as well as increase the productivity and well being of the additional inhabitants that enjoy natural light However, such light re-directing structures while generally effective have limitation and trade-offs between desirable benefits and undesirable effects. Further, the utility of current light redirecting structure are limited to particular daylight hours.

Hence, it is a general objective of the invention to increase the efficiency of light re-direction while simultaneously greatly reducing the undesirable effects that may have been unappreciated or poorly understood in the prior art.

The above and other objects, effects, features, and advantages of the present invention will become more apparent from the following description of the embodiments thereof taken in conjunction with the accompanying drawings

SUMMARY OF INVENTION

In the present invention, the first object is achieved by providing a louver, comprising a generally rectangular planar support member having, an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the front side that is parallel to the right side, a light redirecting structure that is at least one of attached to and disposed within the planar support member, the light redirecting structure comprising a plurality of spaced apart light reflective surfaces that terminate at corners, wherein the light reflecting surface thereof extend across the planar support member from the front side to the back side in which each light reflective surface faces the front or back side, wherein the light reflective surface is operative to increase the width of a main specular re-directed beam of incident light by at least about ±1°, but more preferably at least about ±2° and most preferably by at least about ±4°.

A second aspect of the invention is characterized by the louver wherein the light reflective surfaces have a portion that is parallel to the opposing surface of each optical element and a portion that deviates in angle by up to at least about 2°.

Another aspect of the invention is characterized by the louver wherein a portion of the reflective surfaces are tilted with respect to the front and back edge to provide the increase in width of a main specular reflected beam of incident light by at least about ±4°.

Another aspect of the invention is characterized in by the louver wherein the spaced apart light reflective surfaces are formed by a series of stacked transparent optical elements.

In the present invention, the first object is achieved by providing a louver, comprising a generally rectangular planar support member having; an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the front side that is parallel to the right side, a light redirecting structure that is at least one of attached to and disposed within the planar support member, the light redirecting structure comprising a plurality of spaced apart light reflective surfaces that terminate at corners, wherein the light reflecting surface thereof extend across the planar support member from the front side to the back side in which each light reflective surface faces the front or back side, wherein the light reflective surfaces is operative to increase the width of a main specular reflected beam of incident light by at least about ±4°.

A second aspect of the invention is characterized by the louver wherein the light reflective surfaces have a portion that is parallel to the opposing surface of each optical element and a portion that deviates in angle by up to at least about 2°.

Another aspect of the invention is characterized by any such louver wherein a portion of the reflective surfaces are tilted with respect to the front and back edge to provide the increase in width of a main specular reflected beam of incident light by at least about ±4°.

Another aspect of the invention is characterized by any such louver wherein the spaced apart light reflective surfaces are formed by a series of stacked transparent optical elements.

Another aspect of the invention is characterized by any such louver wherein the spaced apart light reflective surfaces have a portion have a planar portion and a non-planar portion.

Another aspect of the invention is characterized by any such louver wherein the spaced apart light reflective surfaces have a diffusing portion.

Another aspect of the invention is characterized by any such louver wherein the non-planar portion has a sinusoidal variation in one of the slope, height and wavelength.

Another aspect of the invention is characterized by any such louver wherein the sinusoidal variation in one of the slope, height and wavelength is at least partially random.

Another aspect of the invention is characterized by any such louver further comprising a pattern of light attenuating elements disposed on one of the upper surface and the lower surface.

Another aspect of the invention is characterized by any such louver wherein the light attenuating elements are disposed on one of the upper surface and the lower surface to provide an internal attenuation of incident light of about 10% to about 40%.

Another aspect of the invention is characterized by any such louver wherein the light attenuating elements are round dots disposed in columnar arrays with an offset of adjacent columns.

Another aspect of the invention is characterized by any such louver wherein the round dots have a diameter of between about 0.5 to 3 mm.

Another aspect of the invention is characterized by any such louver wherein the light attenuating elements have a grey appearance.

Another aspect of the invention is characterized by any such louver wherein the light attenuating elements are opaque and non-scattering.

Another aspect of the invention is characterized by any such louver further comprising a pattern light diffusing elements disposed on one of the upper surface and the lower surface.

Another aspect of the invention is a light re-directing louver assembly comprising a plurality of louvers that are operatively coupled to be tilted, each louver comprising a generally rectangular planar support member having; an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the front side that is parallel to the right side, a light redirecting structure that is at least one of attached to and disposed within the planar support member, the light redirecting structure comprising a plurality of spaced apart light reflective surfaces that terminate at corners, wherein the light reflecting surface thereof extend across the planar support member from the front side to the back side in which each light reflective surface faces the front or back side, wherein the light reflective surfaces are operative to increase the width of a main specular re-directed beam of incident light by at least an angular deviation that arise between adjacent louvers in the louver assembly.

The above and other objects, effects, features, and advantages of the present invention will become more apparent from the following description of the embodiments thereof taken in conjunction with the accompanying drawings.

BRIEF DESCRIPTION OF DRAWINGS

FIG. 1A is a cross-sectional elevation view of the desired effect of light re-directing structures toward noon time when light is incident at high angles on vertical glazing surfaces, whereas

FIG. 3A-D are cross-sectional elevations of a ganged louver assemblies formed from light redirecting structure, in which FIG. 3A corresponds to the orientation in the lighting conditions of FIG. 1A, and FIG. 3B corresponds to lighting conditions of FIG. 1B, and in which FIG. 3C is an optional orientation for the louvers in the assembly. FIG. 3D is a perspective view of an embodiment of the invention in the form of a louver panel of the assembly.

FIG. 16A-C illustrate alternative embodiments for forming various embodiment by a molding process that produces a spacer member.

FIG. 17A-C illustrate alternative embodiments for forming various embodiment by a molding process that produces a spacer member on a different surface.

FIG. 21A is a cross-sectional elevation view of the light re-directing film of FIG. 20 after application to the glazing, whereas FIG. 21B is a rear elevation of the glazing showing the pattern of absorbing and/or diffusing members.

FIG. 23A is a cross-sectional elevation of an embodiment of the invention, whereas FIG. 23B is cross-sectional elevation of an alternative related embodiment of the invention fabricated using the sheet shown in FIG. 22.

DETAILED DESCRIPTION

Figure 1A:
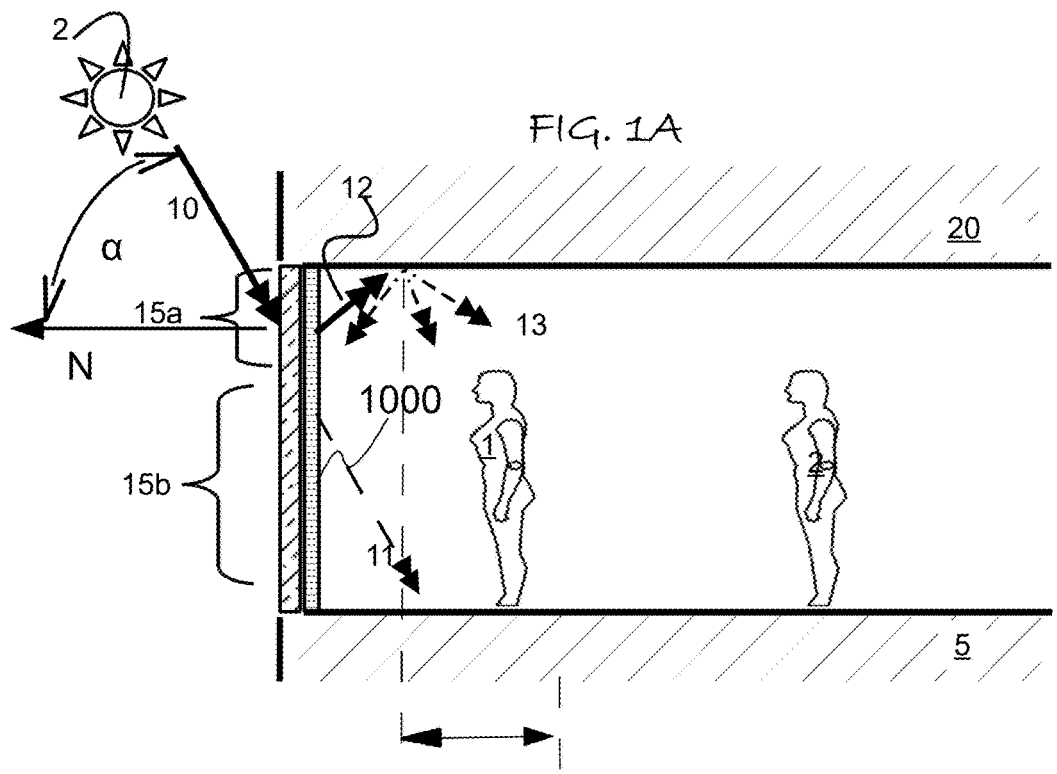

Referring to FIGS. 1A through 26C, wherein like reference numerals refer to like components in the various views, there is illustrated therein a new and improved Louvered Light Re-Directing Structure, generally denominated 1000 herein.

In accordance with the present invention the Louvered Light Re-Directing Structure 1000 comprises a plurality of elongated narrow and thin slats or louvers 600 (see perspective view in FIG. 3D) which individually or collectively have specific constructions described in details below. Other aspects of the invention include deploying slats 600 with different constructions, and that are separately adjustable.

A slat or individual louver 600 should be understood to be a generally rectangular planar support member having an upper surface and a lower surface opposite the upper surface, an elongated front edge on a side orthogonal to the plane of the upper surface, and an elongated back edge opposed to and parallel with the front edge, a right side on another side that is orthogonal to both the upper surface and the front edge, and a left side opposite the front side that is parallel to the front side, and a light redirecting structure either attached to or disposed within the planar support member. The light re-directing structure would comprise a plurality of spaced apart light reflective surfaces 110a and/or 110a' that terminate at corners, wherein the light reflecting surface thereof extend across the planar support member from the front edge to the back edge; so that each reflective surface is orthogonal to the planes of the left and right side sides of the planar support member.

In some preferred embodiments described more fully below, the light reflective surfaces preferably have a periodic pitch of more than about 0.5 mm.

In other embodiments of the light re-directing structure 1000, different slat or louvers 600 are combined in a stack, in which the louvers are tiltable, but each louver need not have the same light redirecting properties as the other louvers in the structure.

Figure 1B:
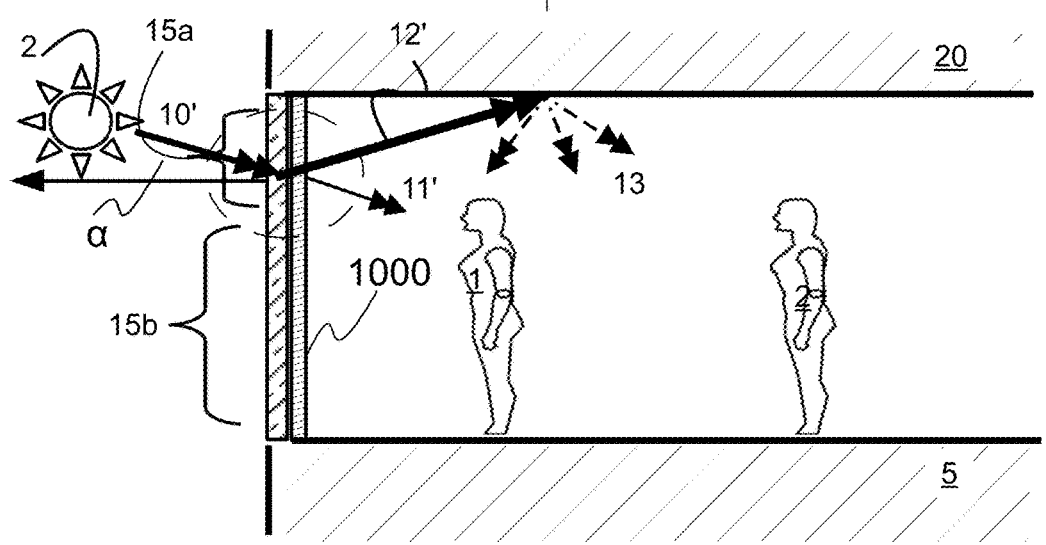
FIG. 1B is a similar elevation view showing the actual effect of the configuration of FIG. 1A earlier in the morning or later in the day.

FIG. 1A illustrates the preferred use of a day light re-directing structure or louver array 1000 deployed to direct at least some portion of light rays 10 incident at high angles from the sun 2 on glazing 15 away from the path 11, which it would otherwise take in a room toward the floor 5, and re-direct it back upward towards the ceiling 20 as ray 12. Thus, incident sunlight is re-directed to the ceiling 20, as ray 12, where it will be scattered off the ceiling 20, providing occupant 2, whom is farther from a window glazing 15 than occupant 1, with diffused natural light 13. In FIG. 1B, the sun 2 is at a slightly lower elevation, some rays 10' would also be re-directed, as rays 12', though deeper in the room, where it is scattered off the sealing as diffused natural light 13'.

Hence, conventional light re-directing film applied on the entire window surface would not be able to provide the benefit of FIG. 1A, and also alleviate the annoying direct light in FIG. 1B. Further, although diffuse coating on a side of the convention light directing film can reduce glare, it also limits see through visibility. Hence, in uses where visibility is critical, the application of convention light re-directing films would be limited to the clerestory portion of the window 15a and the lower portion 15b of the window or glazing 15 would be covered with conventional shades or blinds.

FIG. 3A-D generally illustrates the various embodiments of the invention 1000, as a ganged assembly of slats 600 in which the slat are tiltable.

In FIG. 3C, the light re-directing optical structure 1000, is an assembly of louver or slat elements 600 (as shown in FIG. 3D among others), with each slat or louver element 600 being an independent light re-directing optical structure, which in at least a portion of the assembly are capable of rotation via a coupling or cable 620 to accommodate the variation in sun angle over the day. Thus, the tilting of the louvers or slat 600 permits a more efficient re-direction of incident sunlight, which scatters off the ceiling as, rays 13, over a larger portion of the day.

Each louver or slat 600 is a transparent rigid planar support surface in a rectangular shape having opposing faces, and a set of orthogonal front and rear faces and left and right side edges, in which the faces are longer than the edges.

Figure 2:
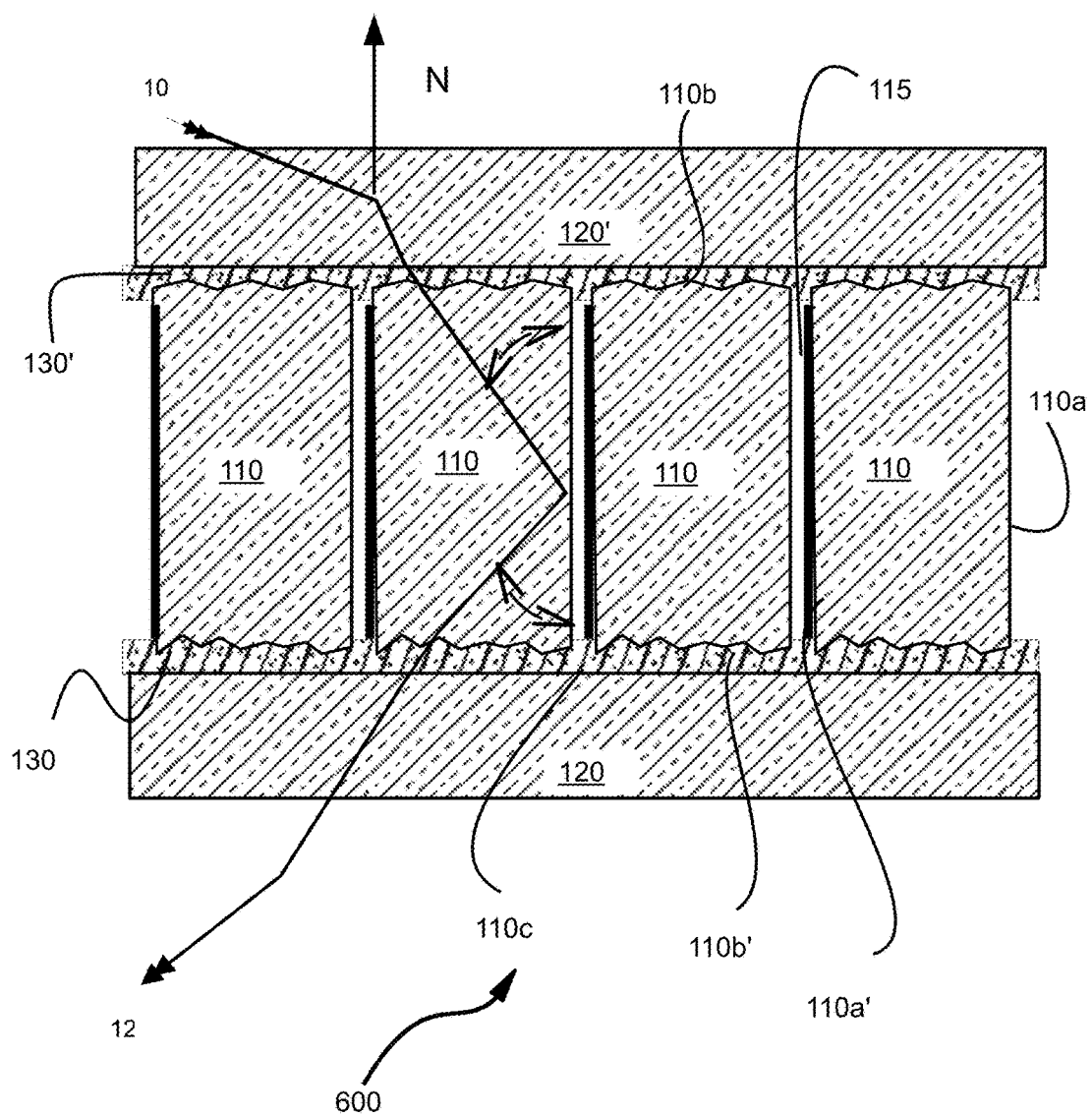
FIG. 2 is a cross-sectional elevation of a light redirecting structure that deploys an assembly of optical elements having planar orthogonal surfaces.

The louvers 600 are preferably constructed of generally elongated optical elements 110 that are assembled by a stacking process, and are preferably held together between front and rear surface 120' and 120 respectively, as shown in FIG. 3D, with FIG. 2 showing an enlarged portion of a louver or slat 600 in which faces 120' and 120 are horizontally disposed. Adhesive layer 130 and 130' may be deployed to attach the plurality of optical elements 110 to the respective front and rear surfaces 120' and 120.

FIG. 2 also illustrates that the optical elements 110 may deploy a light absorbing coating or covering 110c on surface 110a' of each optical element 110. The light absorbing layer precludes the re-direction of light that impinges on layer 120' from below the horizon, as may occur at night from headlamps and street lighting when device 1000 is used in building floors above street level. Such discrete light sources would produce annoying light re-directed downward from the louver assembly, as well as preclude a room from staying dark when this is desired. The absorbing surface 110c also provides the benefit that light incident at high azimuthal angles, as shown in FIG. 5B, rather than undergoing a double reflection, off both surface 110a' and 110a, and heading toward the floor would be absorbed at layer 110c.

Figure 4:
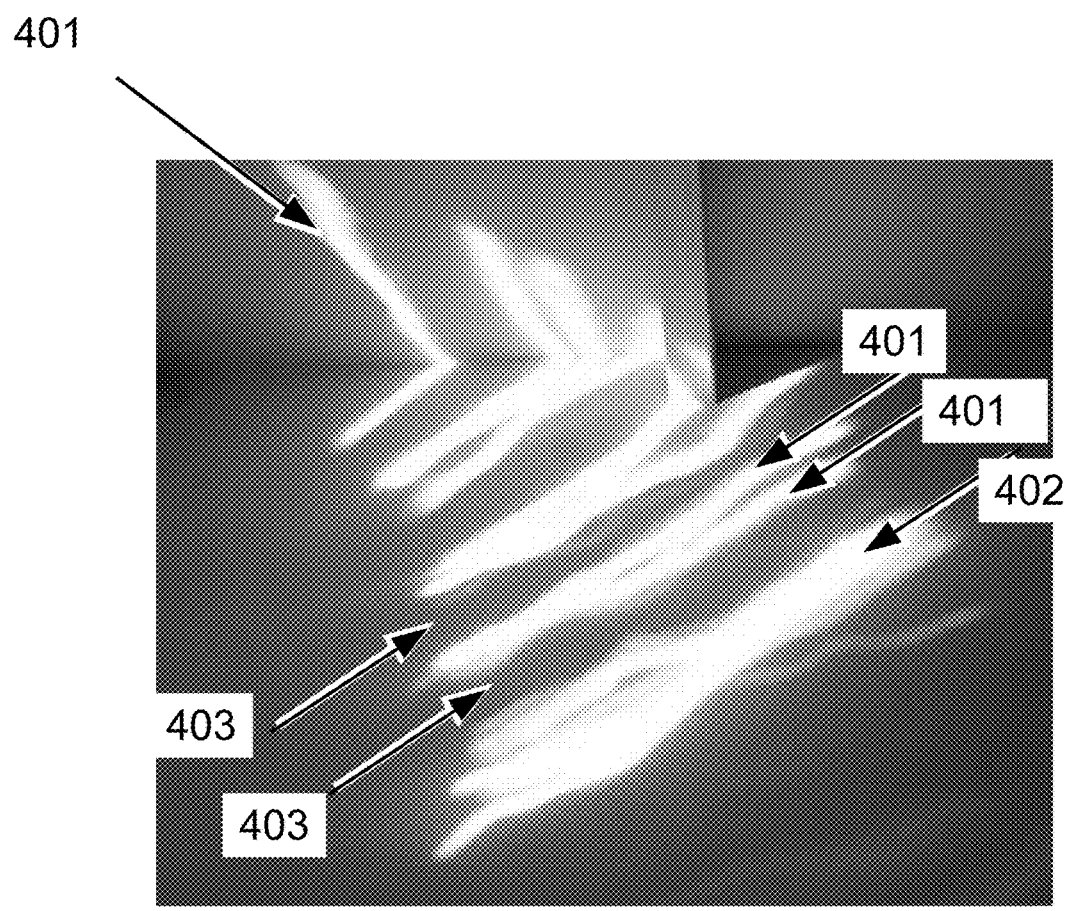
FIG. 4 is a photograph showing an example of the projected pattern of louvers on a interior wall

As shown by the photograph in FIG. 4, an actual louvered device 1000 with slats or louvers 600 optimized for light re-direction can project a discrete image (401) of each slat 600 on both vertical (floor and ceiling) and horizontal walls. It would be more desirable if the slat assembly 1000 did not produce discrete images of each slat 600, but more uniformly redirected light into the structure. These strong discrete projected images are now understood to be from a combination of tilt errors, which throws light out of one area, leaving a dark spot (403) while placing the light over a neighbor's light. Thus some areas (402) have double or triple the light intensity of a single neighboring slat. The waviness along the light (bottom left to upper right) is caused by wavy log like elongated optical elements 110.

It has now been discovered that the discrete images of each slat are caused by multiple factors. One such cause is the physical gap between each pair of slats, which is tilt dependent. Even if the slat 600 are tilted by the identical angle in the assembly 1000, slight defects in structure produce noticeable effects, which are accentuated by deviation in tilt. Deviations from identical tilt can occur from slack or hysteresis in the mechanical drive system 620, and possibly wear of mechanical components, as well as assembly and component tolerances.

Small deviations greatly accentuate the image of the gaps, in that some bright areas will overlap, doubling the intensity (402), while intervening areas (403) will be darker. Thermal or other distortion of each slat 600 or slight deviations in mounting can also occur and contribute to the projection of slat image on the ceiling, walls or floor.

Accordingly, the various embodiment of the invention disclosed below are intended to produce and assemble macro-optical elements 110 into slats 600 with intervening TIR surfaces in a manner where the angular distribution of reflected light has a pre-determined distribution with respect to the slat dimensions. The distribution is intended to eliminate the projection of discrete slat images. The most preferred embodiments are also intended to eliminate the projection of slat images without unduly degrading the efficiency of light reflection or introducing glare, that is, bright spots, bars, beams, rings or halos when the slat area is viewed directly.

It is also desirable to achieve the pre-determined angular distribution of light from each slat without unduly degrading see through visibility. In other words, a room occupant, when looking at the window, should not have a distorted or defocused view of the exterior, nor should they see annoying bright regions, or glare.

Since macro optical elements 110, with width greater than about 0.5 mm, are needed to minimize glare by minimizing diffraction, there is now a need to spread light evenly across the interior ceiling, since re-directed sun light is highly collimated. The various embodiments of the invention and methods of fabricating such embodiment provide a viable construction for making the re-directed light sufficiently less collimated to account for construction and use deviations, while preferably maintaining a see-through function.

Several embodiments deploy preferred embodiment of the stacked optical elements 110, while other deploy specific constructions of the slats 600.

Other embodiments of the invention are directed to method of fabricating such optical elements 110 and/or slats 600.

Figure 5A:
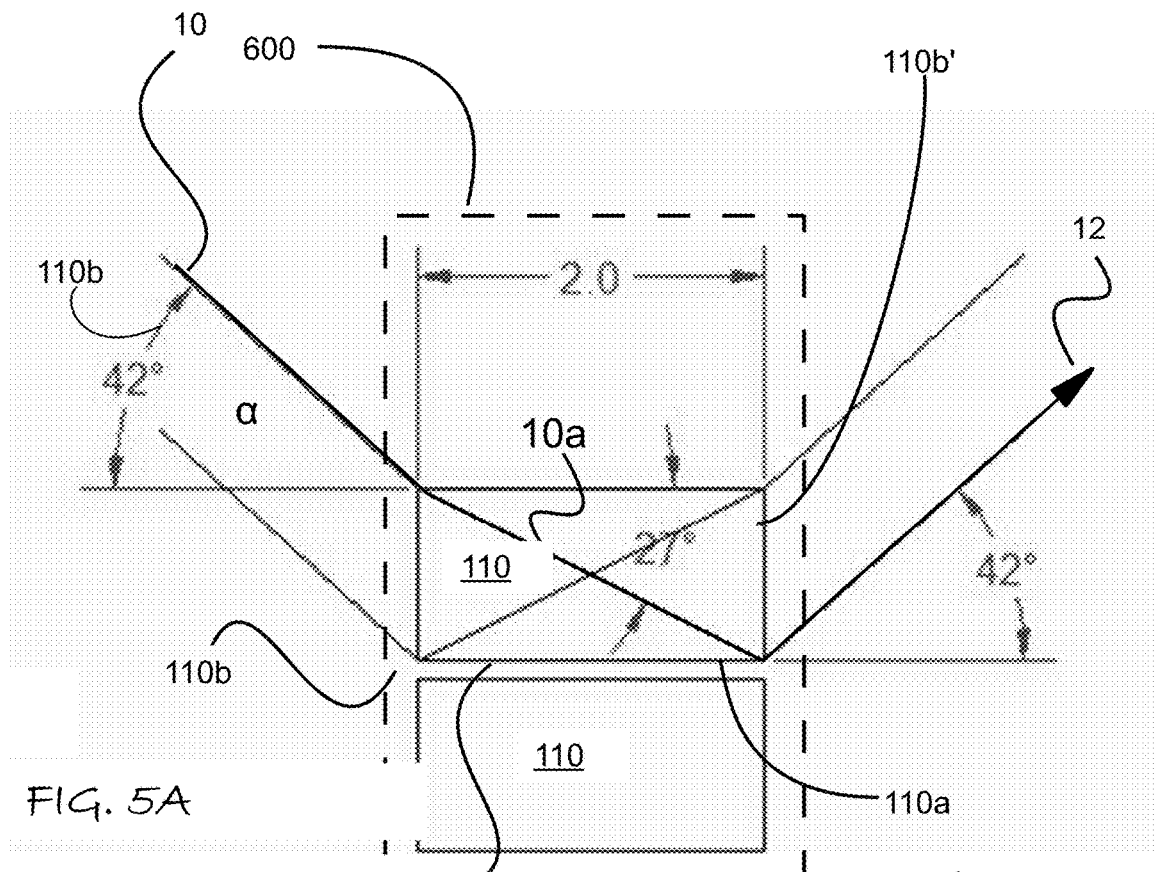
FIG. 5A is a schematic cross-sectional elevation of a portion of a louver assembly modeled in FIG. 6 and FIG. 7 with ray tracings.
Figure 5B:
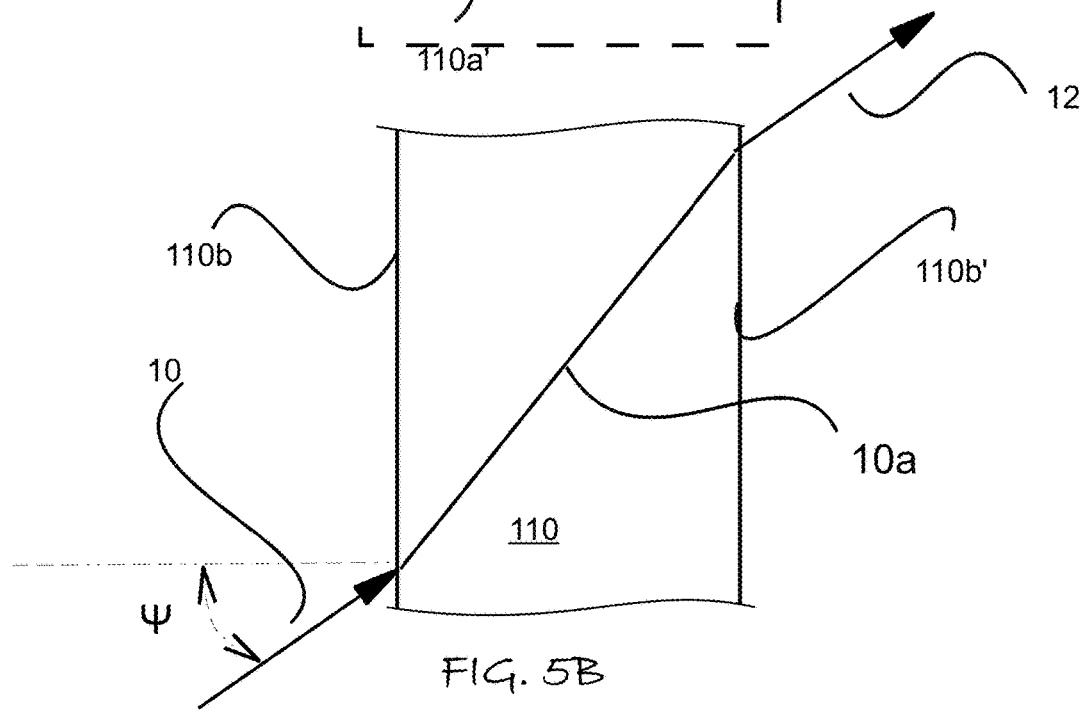
FIG. 5B shows the ray tracings in FIG. 5A in a plan view.

FIGS. 5A and 5B illustrates the ray tracings of a rectangular optical element 110 in the louver slat 600. For simplicity, the rays are traced only through the portion of the slat 600 having TIR at surface 110$a'$. Each optical element 110 has a width of about 2 mm and a height of about 1 mm for a 2:1 aspect ratio. Light incident at 42° from normal is refracted to 27° inside the optical element, and after undergoing TIR on surface 110$a$ exits rear surface 110$b'$ at 42°. It has been discovered that this element size and aspect ratio is optimal for medium angle sun, in which the azimuthal angle is high in the morning and afternoon and the elevation angle, α, is between about 30 to 65°.

As illustrated in FIGS. 5A and 5B, when the sun elevation decreases, there is an increase in azimuthal angle (ψ) of incidence on glazing surface 15 and optical element 110, which has reflective upper and lower surface 110$a$ and 110$a'$. Hence, the light incident on any optical structure used for light re-direction will have a greater path length as shown in the plan view in FIG. 5B, in which ray segment 10$a$ within the optical structure is longer as the azimuthal angle increases. Thus, some of these rays as shown in elevation view in FIG. 5A, entering the optical element 110 as ray 10, will undergo a first reflection at the lower surface 110$a'$, and then be directed upward and in the room direction and exits as ray 12. However, others rays will actually undergo 2 reflections, the second on the upper reflective surface 110$a$, and continue to the exit face of the optical element 110 but directed downward. Thus, optical re-directing structure will lose efficiency during the day as the suns position changes unless the angle of slat assembly 600 is fixed. As shown in plan view in FIG. 5B, the high azimuthal angle increase the path length 10$a$ in element 110, so that the shorter width of TIR surface 110$a'$ minimizes the amount of light that is lost or not utilized from double reflections, which would be directed to the floor and not the room interior. In such cases, it is actually preferred that light that would undergo a second reflection is absorbed by an optional layer 110$c$ deposited on what would otherwise be a TIR surface 110$a$.

Figure 6:
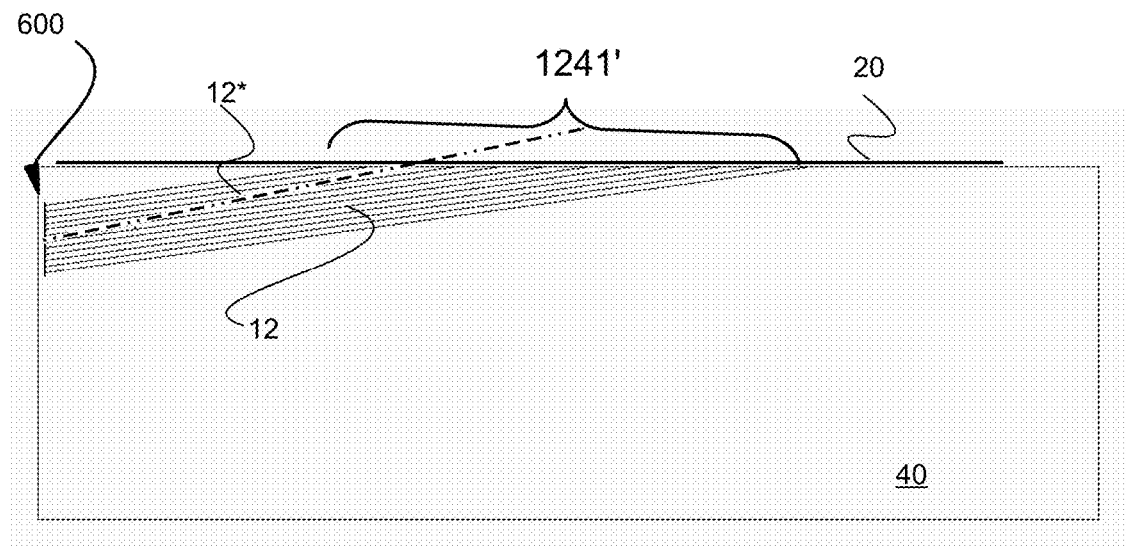
FIG. 6 is a ray tracing diagram corresponding to FIG. 5A showing potential deviation from a single louver.
Figure 7:
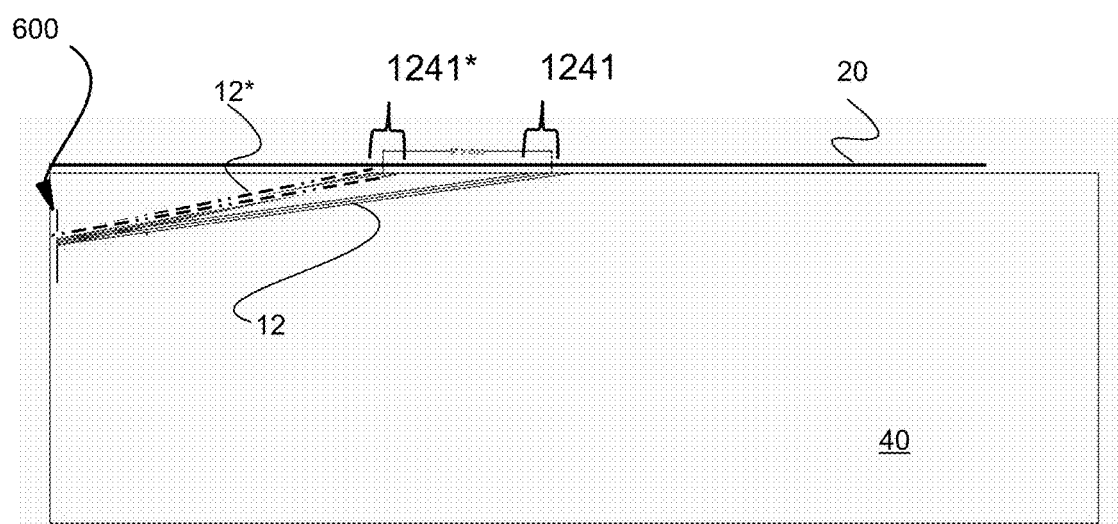
FIG. 7 is a ray tracing diagram corresponding to FIG. 5A showing potential deviation from light incident on the entire louver assembly.
Figure 8:
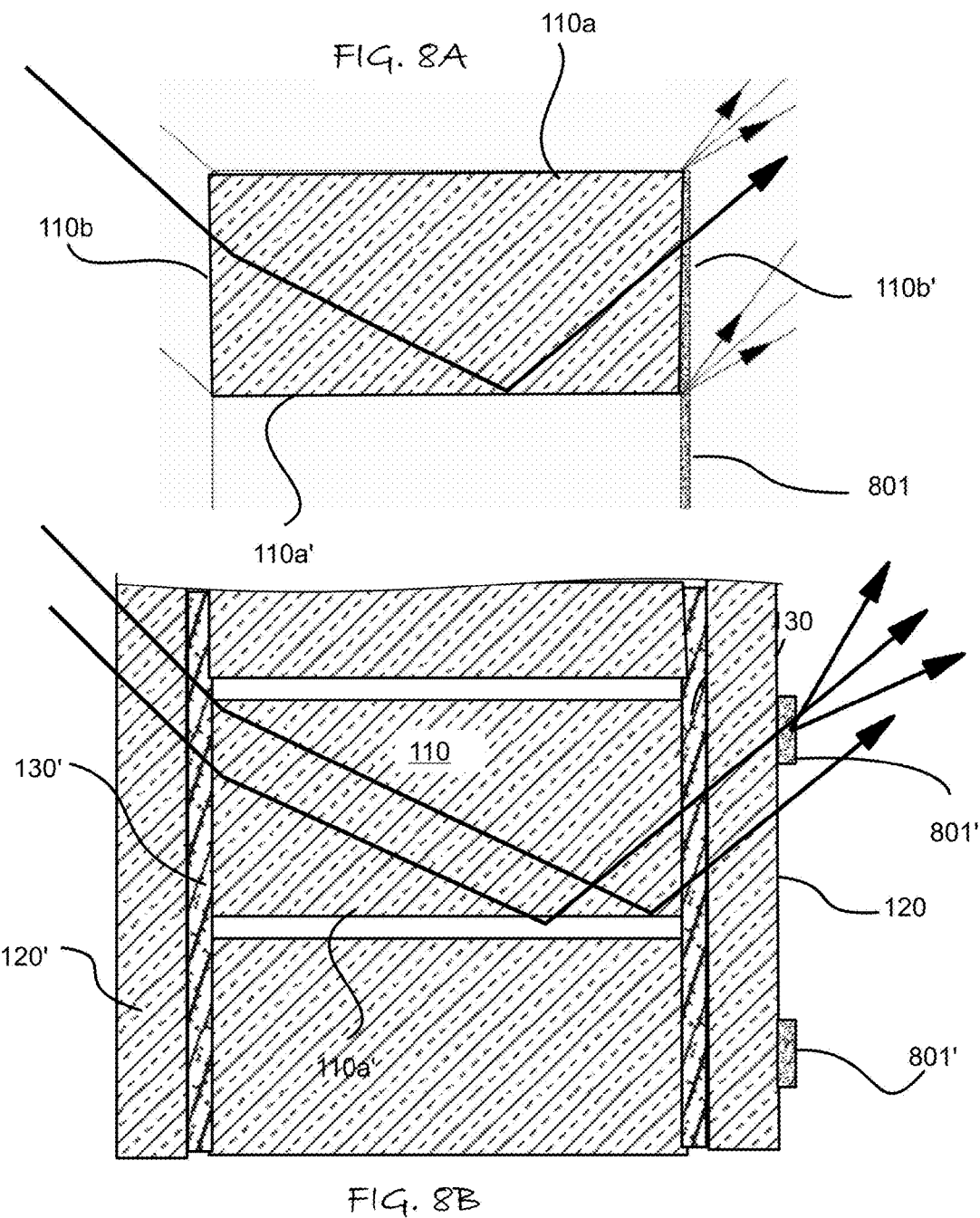
FIG. 8A is a schematic cross-sectional elevation with ray tracings to illustrate the operation of a first embodiment of the invention, whereas FIG. 8B similarly illustrates a related embodiment.

FIGS. 6 and 7 illustrate the projection geometry of the louvers 600 on the ceiling 20 or room 40 to explain the theory of operation of the various embodiments now illustrated in FIG. 8-24. Room 40 is 10 feet high and 30 feet deep. Louver assembly 1000 is 2 feet high and starts 1 foot from the ceiling 20.

It has been observed that depending on the mounting and rotary means for the slats 600, the lateral displacement of the slats 600 can vary by as much as 2 mm for a 50 mm (2 inch) high slat. Hence, the tilt angle between these slat is about tan (2/50) or about 2 degrees. A ±2° deviation in orientation from each slat will result in a 4° deviation in the projected image of each slat. It is preferred that each slat diffuses light beyond the pure collimated image by at least the amount of deviation from all sources. To spread the light beyond this range requires some fraction of the TIR surface to deliberately deviate over a similar range, for this 4 degree deviation, some portion of the TIR surface should have 2 degrees of slope deviation in the TIR reflection surface from the nominal orientation.

FIG. 6 illustrate the bundle rays 12 as multiple parallel lines that exit the center of the surface of each slat 600 in an array that illuminate the ceiling 20 of room 40. Ray 12* results from a 2 degree deviation in tilt from the center of the center slat in the array. The array of slats spread light over the ceiling in region 1241'.

FIG. 7 compares the ray 12' from single slat 600 adjacent the deviant slat that produces rays 12*. The tilt error of 2 degrees in a slat, represented by ray 12*, has moved the center of that beam from position 1241 to 1241*, approximately 57 inches on the ceiling 20, at this re-direction angle. This 57 inch movement corresponds to observations of variance that arise from assembly deviations as well as slat deviations and thermal distortion.

If a given slat 600 is not parallel to the adjacent neighboring slat within 2 degrees, the re-direction error will be twice that amount, or 4 degrees. If the light from each slat 600 can be spread over the same 4 degrees of deviation then slat images will overlap, removing the gaps between them and the patterns these deviations cause. However, it should be noted that it is possible for two slats next to each other to have a rotational deviation in opposite directions, which increase the ray deviation to about 8 degrees still providing non-uniform illumination on the ceiling, which the preferred embodiments are intended to minimize. According, the following means for overcoming this angular deviation is not limited to solutions for 2° deviation, as it will be apparent to one of ordinary skill in the art that teachings of the invention can be applied to other deviations that arise between adjacent or more distal slats 600 in a louver assembly 1000.

FIG. 8A is a schematic cross-sectional elevation with ray tracings to illustrate the operation of a first embodiment of the invention. Optical element 110 has surface 110*b* covered by a diffusing rear surface 801. The diffusing surface 801 would spread each ray that undergoes TIR in optical element 110 by about 2 degrees in each direction from the central beam, and more preferably 4 degrees. However, a uniform diffuse coating would degrade see through visibility of the louver assembly 1000. A more preferred variation on this embossment is illustrated in FIG. 8B in which the diffuse coating 801' is applied as a pattern. Since the preferred optical elements 110 have a height of about 1 mm in the vertical direction, it would be more preferable if each part of the pattern formed by elements 801' is less than this height, and more preferably about a ¼ to a third the element height, that is about 0.25 to 0.33 mm. Such a pattern would not destroy see through visibility. The area of the patterned elements 801' can be reduced by increasing the scattering power, that is have a more diffusing coating in the element 801 that cover the entire rear surface of the slat 600. The total area of the patterned elements is perhaps about 1 to 5% of the covered glazing surface or surface of vertical louvers 600, which preferably have dimensions of circa 2 to 7 mm, and more preferably 5 mm×5 mm, with a spacing of preferably about 10 to 30 mm, but more preferably about 23 mm.

In another embodiment of the invention, the diffuse dots/squares, lines and like shown in FIGS. 8B, 20, 21 and 21B are alternatively non-diffuse, opaque regions that are optionally neutral or colored to provide a pattern that aids in masking the lone and isolated optical defects that would otherwise standout as cosmetic imperfections. The provisional of such opaque pattern regions in a repeating or non-repeating pattern of dots, squares or any geometric array at a low coverage percentage of circa 0.1 to 10%, and more preferably 1 to 5%, decreases the perception of such defects to the human eye. Hence, it would also minimize the appearance of seams that might be required in large panels or slat arrays that are not practical to make in a seamless fabrication.

Figure 9:
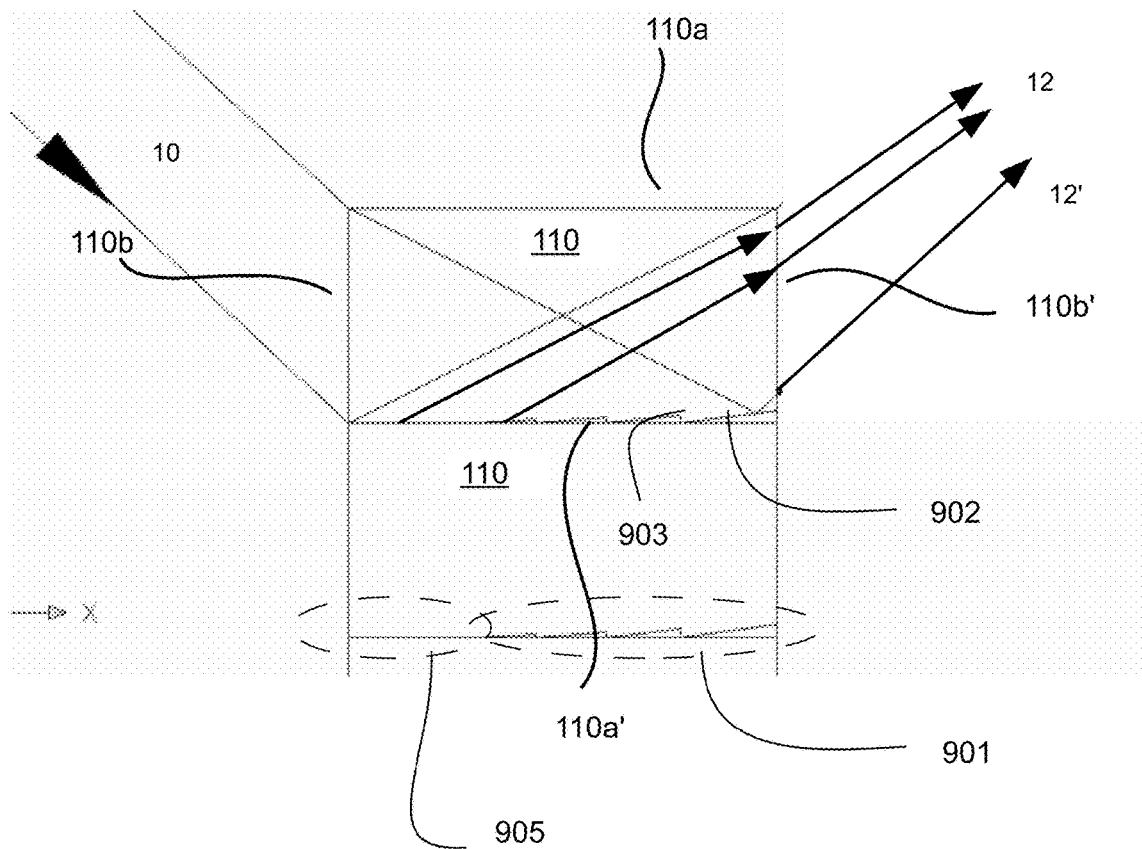
FIG. 9 is a schematic cross-sectional elevation with ray tracings to illustrate the operation of another embodiment of the invention.

FIG. 9 is a schematic cross-sectional elevation of optical elements 110 in a slat 600 with ray tracings to illustrate the operation of another embodiment of the invention. A portion 901 of the TIR surface 110*a'* is not planar and orthogonal to surface 110*b* and 110*b'*, but rather has adjacent titled facets 902 separated by vertical steps 903. The facets 902 increase in tilt angle away from the plane of surface 110*a*. The maximum tilt angle is preferably about 2° from planar portion 095, which is parallel to surface 110*a*.

Figure 10:
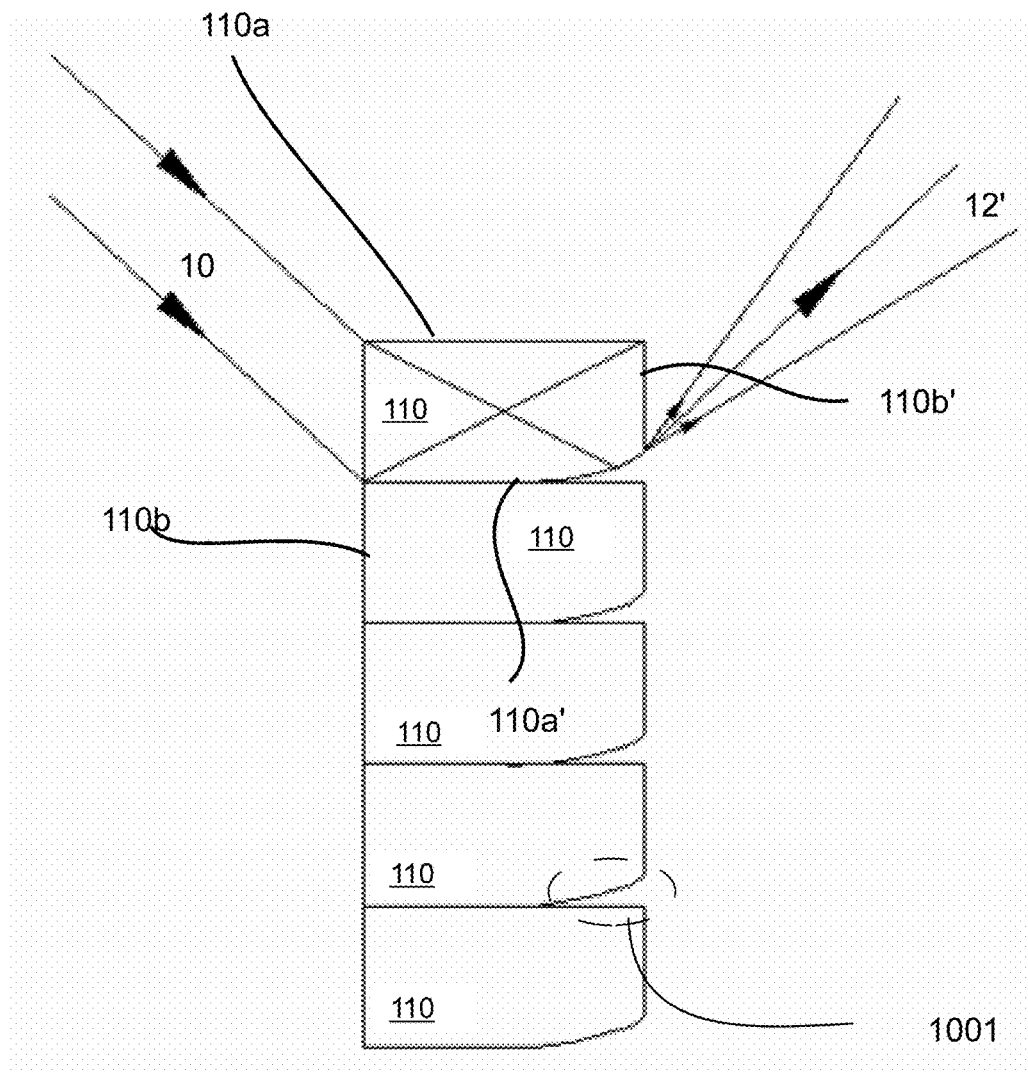
FIG. 10 is a schematic cross-sectional elevation with ray tracings to illustrate the operation of another embodiment of the invention.

FIG. 10 is a schematic cross-sectional elevation with ray tracings to illustrate the operation of another embodiment of the invention in which a portion 1001 of the TIR surface 110*a'* is not planar and orthogonal to surface 110*b* and 110*b'*, but rather gradually increases in curvature as it approaches surface 110*b'*, in essence forming a curved bottom near the corner of each optical element 110.

Figure 11:
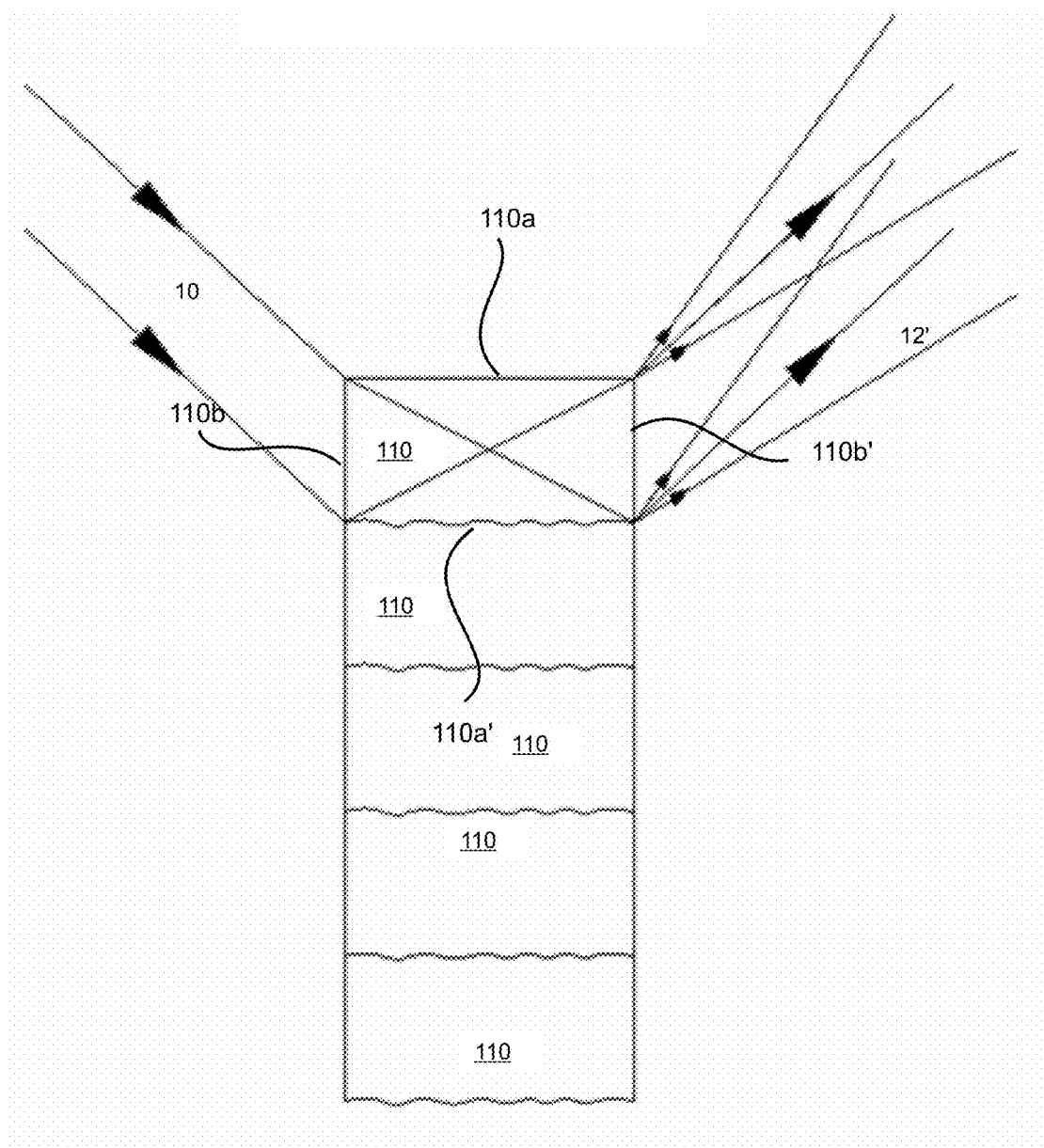
FIG. 11 is a schematic cross-sectional elevation with ray tracings to illustrate the operation of another embodiment of the invention.

FIG. 11 is a schematic cross-sectional elevation with ray tracings to illustrate the operation of another more preferred embodiment of the invention in which the TIR surface 110*a* is non-planar but has a gradually sinusoidal variation in height, to provide an equivalent variation in slope. The variation need not be perfectly sinusoidal, but is preferably gradual to provide at least a maximum slope variation on ±2°. A 2 degree slope means that a line tangent to a portion of the TIR surface deviates from planar shape of the surface by 2 degrees. Hence in a preferred embodiment of the invention each slat 600 will re-direct incident light that is directed downward and upward as a main transmitted beam, while also spreading some light about the main transmitted or re-directed beam 12 by at least about ±1° from the angle of incidence, but even more preferably at least about ±2° from the angle of incidence, and most preferably at least about ±4° from the angle of incidence. Higher spreading of the light from the main beam 12 is also useful in projecting light deeper into a room.

The desired circa 1-2 degree slope deviation is preferably provided by a generally sinusoidal oscillation in the surface shape. The tangents at the peaks and valleys of the surface will have a zero slope, being parallel to the macro-surfaces 110*a'* as well as the opposing upper surface 110*a* of each optical element 110. The surface tangents to the portions between the peaks and valleys will gradually vary in slope between zero and about 2 degrees.

Figure 12:
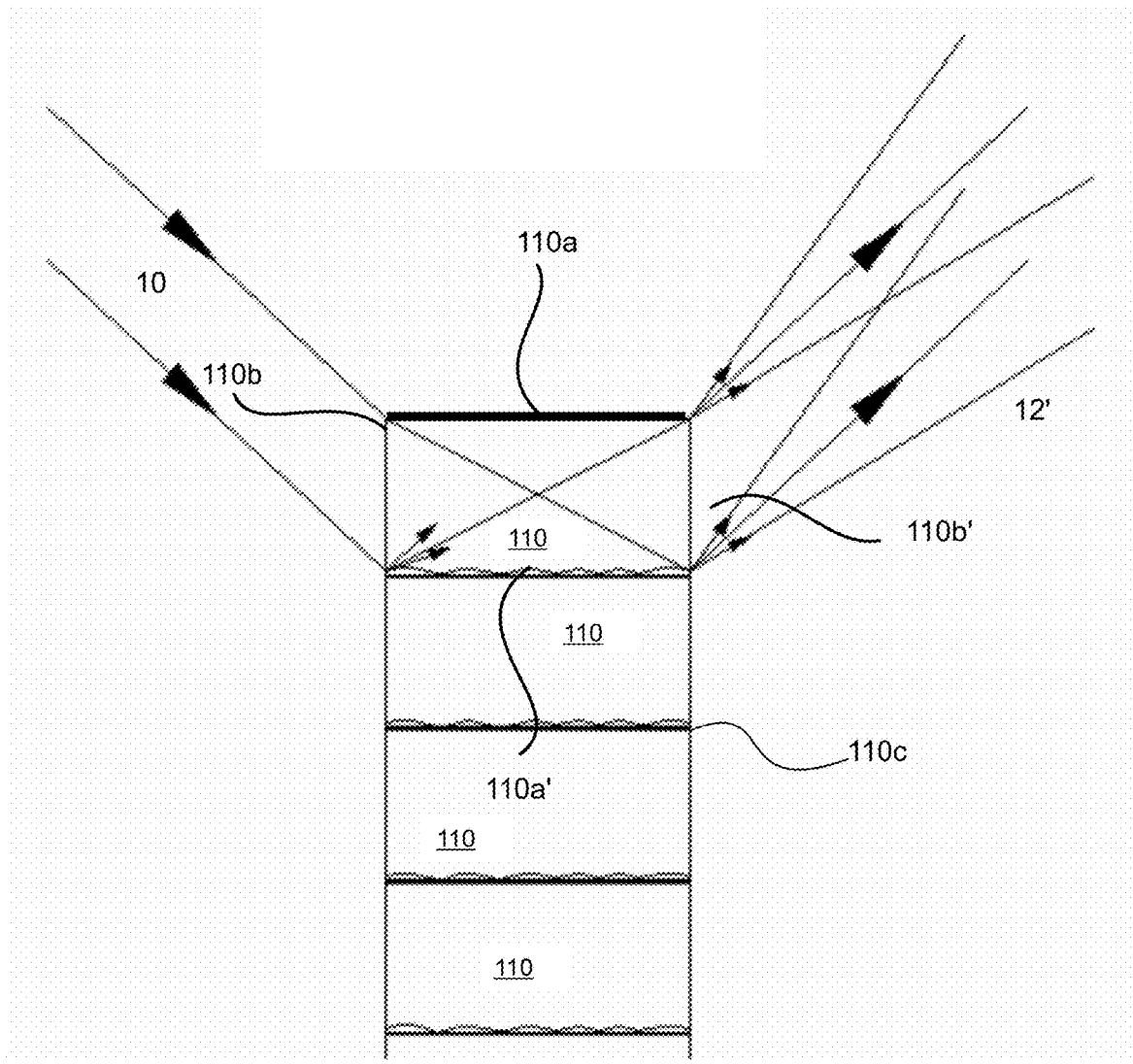
FIG. 12 is a schematic cross-sectional elevation with ray tracings to illustrate the operation of another embodiment of the invention.

FIG. 12 is a schematic cross-sectional elevation with ray tracings to illustrate the operation of another more preferred embodiment of the invention in which surface 110*a* has a light absorbing coating 110*c* and TIR surface 110*a* is non-planar but has this preferred generally sinusoidal variation in slope. When the sinusoidal variation extends entirely across surface 110*a'*, the variation can be two-dimensional, that is each adjacent cross-section have the same shape, or 3 dimensional as well.

Figure 13:
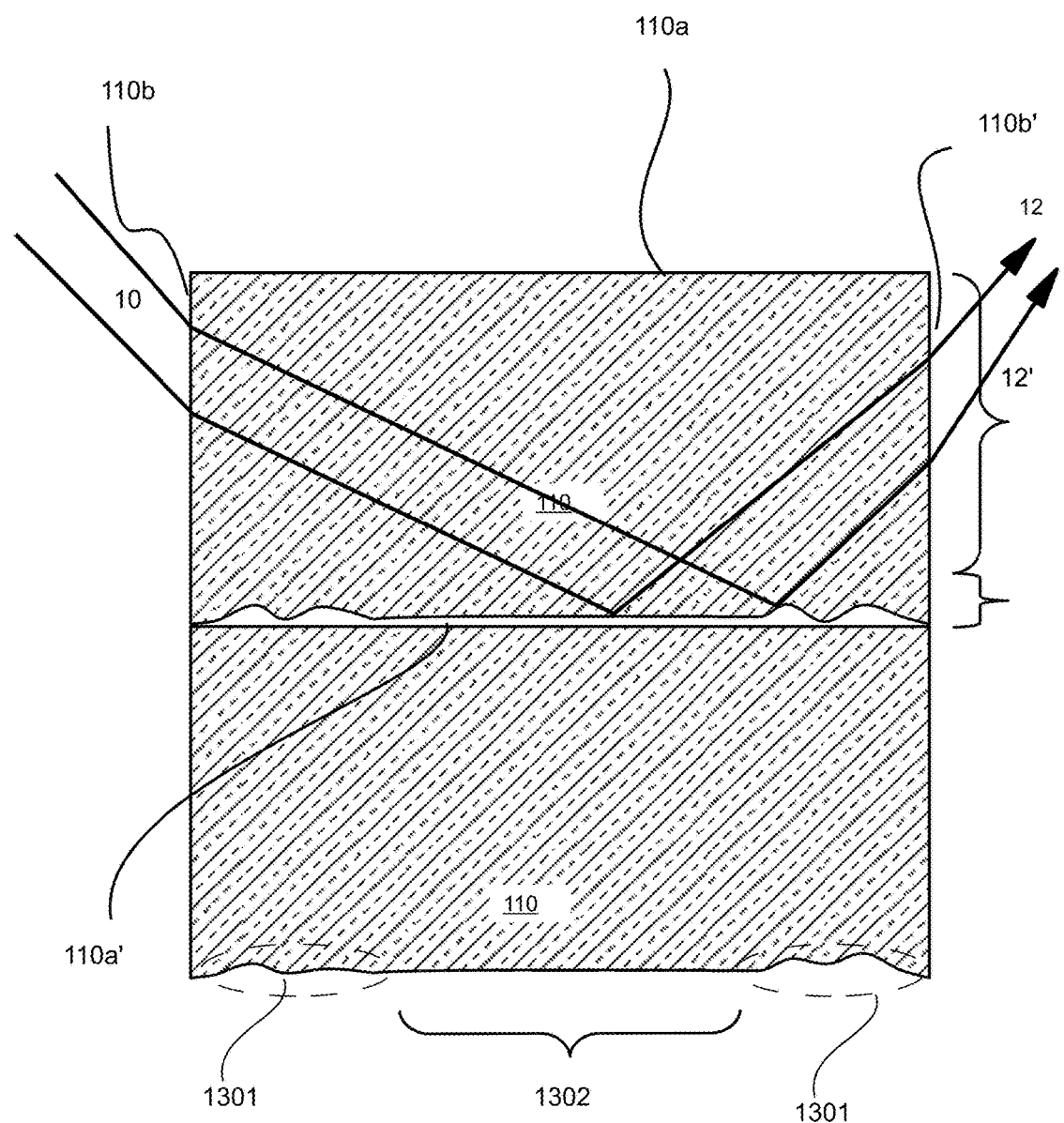
FIG. 13 is a schematic cross-sectional elevation with ray tracings to illustrate the operation of another embodiment of the invention.

FIG. 13 is a schematic cross-sectional elevation to illustrate another embodiment of the invention in which only portion 1301 of TIR surface 110*a* is non-planar but has a generally sinusoidal variation in slope, with a central portion 1302 being planar and parallel to surface 110*a*. Such a general sinusoidal variation in slope is meant to embrace a randomly sinusoidal variation in slopes of between 0 and ±2° and optionally also that the period or wavelength is somewhat random in length.

FIGS. 14A-C and 15A-B illustrate steps in alternative processes of forming an optical element 110 in a louver or slat 600 having the light re-directing attributes of the embodiment of FIG. 11-13.

Figure 14A:
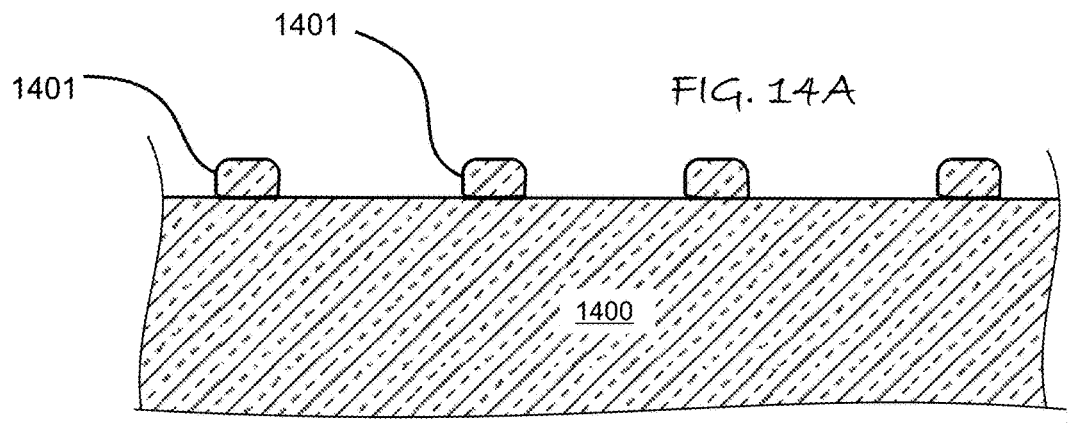
FIG. 14A-C illustrate steps in a first process of forming an optical element in a louver assembly having the attributes of the embodiment of FIG. 11
Figure 14B:
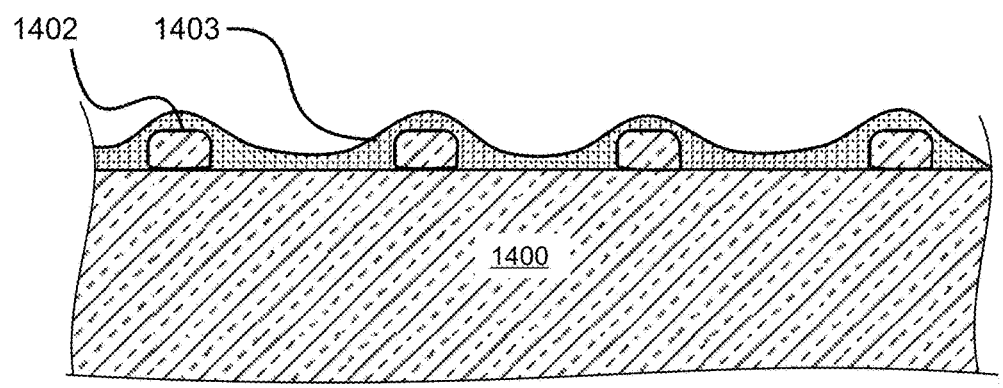
Figure 14C:
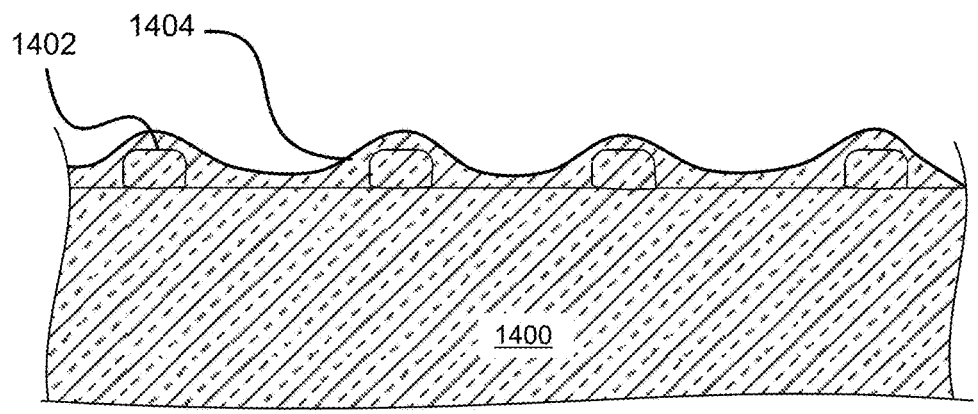

In the step shown in FIG. 14 a transparent fluid, which is preferably a UV curable fluid, 1401 is printed on the surface of the sheet material 1400 used to form elongated optical elements 110. The printing is in a predetermined pattern of a desired spacing and height, which optionally may include a random spacing. The printed coating when cured preferably has an identical refractive index to the underlying generally planar optical substrate material 1400. FIG. 14B shows the fluid 1401 cured to a solid 1402 after a second step of covering with a second fluid coating 1403, which is also preferably curable with UV light to form a solid coating 1404 having an identical refractive index to the underlying optical substrate material 1400.

Figure 22:
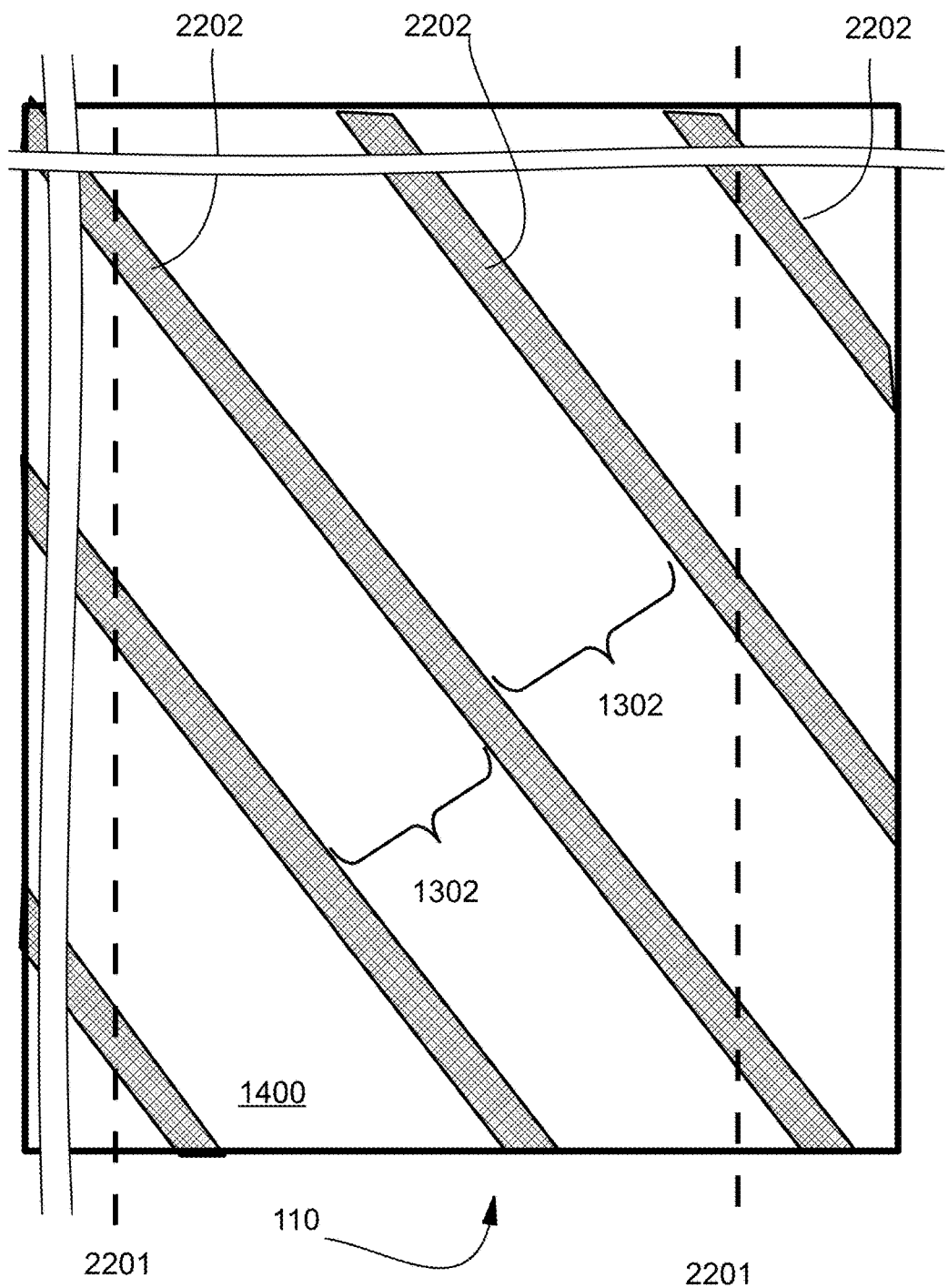
FIG. 22 is a top plan view of a planar sheet shaped substrate used for forming optical elements in various embodiment of the invention.

The viscosity and thickness of layer 1403 will determine the level of shape conformity to the first solid pattern 1402. When layer 1403 is thin relative to the thickness of the solid coating 1402 the degree of wetting from the relative surface tension will provide a wavy sinusoidal variation in shape to provide the desired surface 110*a'* of FIGS. 11-13 and 23A-B. The patterns and thickness of the solid pattern 1403 is selected to provide the wave spacing and height, and hence the degree of surface slope on the solid layer 1404. The printed and coating in this process can be continuous across the entirety of the sheet 1400, or patterned as shown in FIG. 22 to provide the limited portions 1301 of surface shape modulation. This embodiment can provide a 2-dimensional variation in slope when the solid pattern is lines that extend on the long direction of each optical element 110, or 3-dimensions when the pattern is discrete circles, squares, rectangles, polygons, dashed and continuous lines that optionally form a 2-dimensional array on the surface of sheet 1400.

Figure 15A:
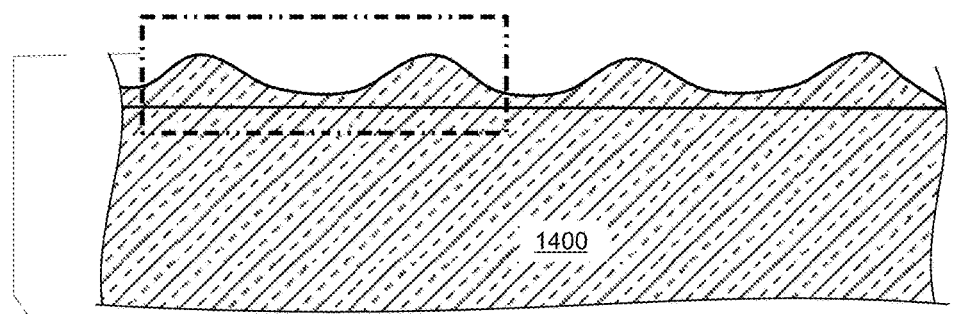
FIGS. 15A and 15B illustrate another process of forming an optical element in a louver assembly having the attributes of the embodiment of FIG. 11
Figure 15B:
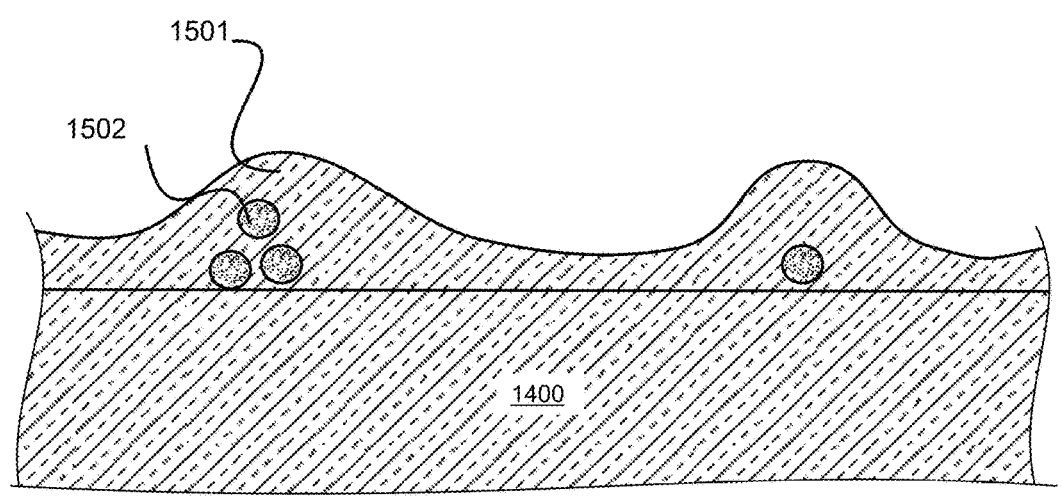

FIGS. 15A and 15B illustrate another process of forming an optical element 110 in a louver assembly having the attributes of the embodiment of FIGS. 11-13 and 23A-B in which the substrate 1400 is coated with a curable fluid 1501 having dispersed filler particles 1502 that are comparable in size to the thickness of the fluid to form a wavy surface pattern. The pattern will not be perfectly periodic, however, as long as the mean repeat distance is much smaller than the width of the TIR surface and the surface slope is between about 2-4°, the anticipated optical benefits should also be achieved. The filler particles 1502 are preferably transparent and non-scattering internally, as well as at the interface with the cured or solid coating, having the same index of refraction. This embodiment has the advantage that a single layer of fluid, such as semi-gloss paint or finish can be applied to the sheet 1400. The aforementioned process can provide regions of the wavy surface pattern that are continuous across the entirety of the sheet 1400, or patterned as shown in FIG. 22 to provide the limited portions 1301 of surface shape modulation. The surface variation will be 3-dimensional in this embodiment. It should be noted that the wavy surface pattern regions that are angle with respect to the sheet 1400 edges can be continuous or discontinuous, be applied in other or multiples directions as well as have other fill factors.

In the embodiments of FIGS. 14A-C and 15A-B, the opposite side of the sheet 1400 can be coated with a black or absorbing coating that forms layers 110c in each optical element. In either case, the sheet 1400 is then cut into long optical elements 110, as described with respect to FIG. 22.

FIG. 16A-C illustrates alternative embodiments of the optical elements 110 with various partially angulated TIR surfaces 110a' formed on optical element 110 by a molding process. Spacers 1601 and 1601 are molded on surface 110a at the same time as the deviation from planarity in surface 110a'. More specifically, the optical element 110 in FIG. 16A has the generally sinusoidal variation in surface slope of FIG. 11-13. The optical elements 110 in FIG. 16B, has the faceted portions 901 of FIG. 9, and the optical elements 110 has the curved portion 1001 of FIG. 10. Spacers 1601 and 1602 preclude the optical elements surface 110a and 110a' from making contact during stacking and attachment to outer covers 120 and 120' of FIG. 3D.

FIG. 17A illustrates an alternative embodiment of the optical elements 110 with spacers 1601 and 1601' are molded on surface 110a', opposite planar surface 110a. FIG. 17B-C illustrates alternative embodiments in which the optical elements 110 have various partially angulated TIR surfaces 110a' formed on optical elements 110 by a molding process. Spacers 1601 and 1601 are molded on surface 110a' along with the variation in shape to spread light that under goes TIR on surface 110a'. These configurations facilitate the blackening of the upper or opposing surface 110a from the TIR surface 110a', to provides the light absorbing upper surface 110c, as shown in FIG. 17C. The surface 110a that is intended to receive the black absorbing layer 110c is initially planar thus easier to uniformly coat at the same time, such as by spray, roller or curtain coating and the like processes. Although the elements 110 are molded separately the coating of layer 110c can occur while they are attached to a common mold runner or ganged together on a common support, such as a vacuum chuck from below.

Figure 18A:
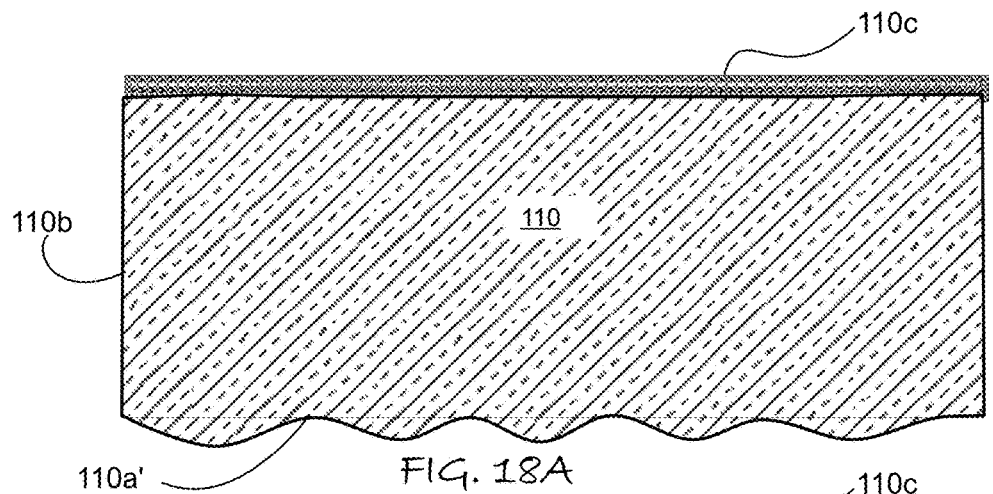
FIG. 18A-C illustrate alternative embodiments for forming various embodiment by a molding process in which the spacer element is a diffuse blackening element coated on the upper surface.
Figure 18B:
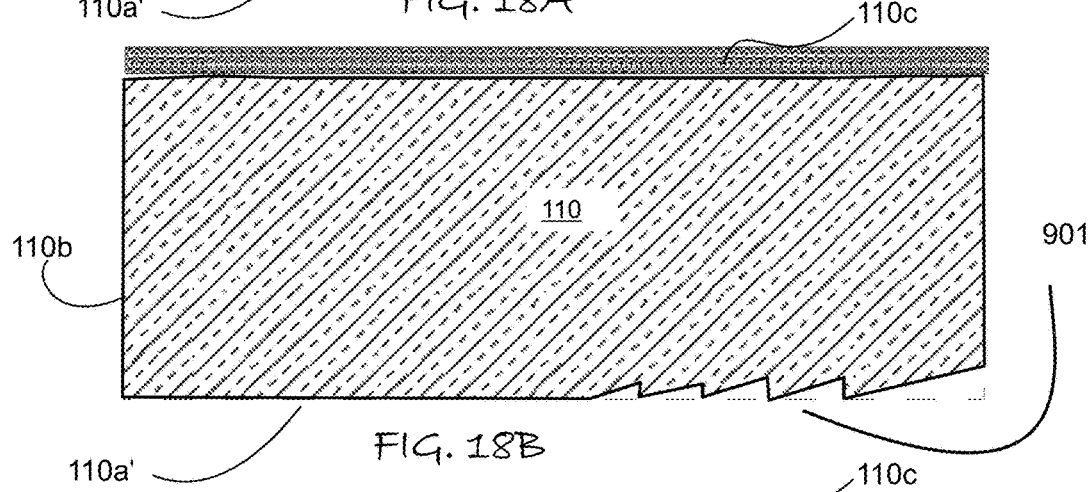
Figure 18C:
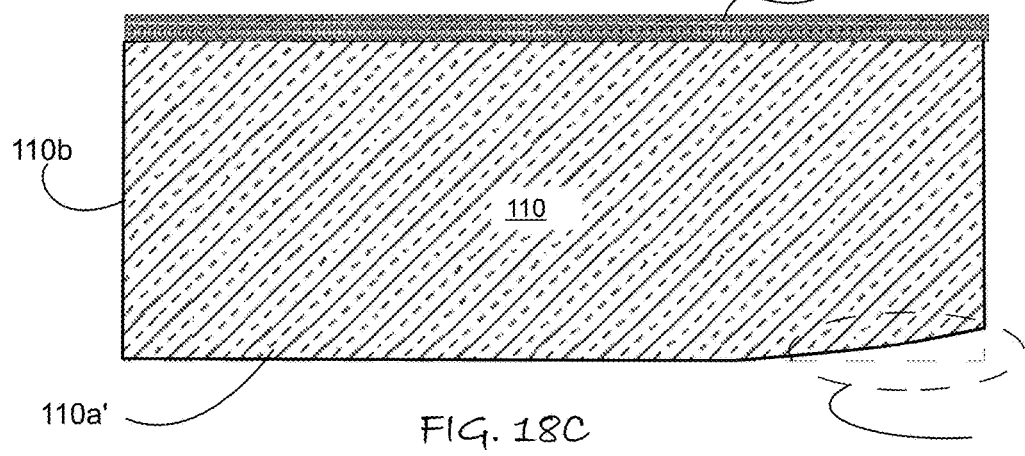

FIG. 18A-C illustrate alternative embodiment of a molding process in which the spacer element 100c is a diffuse blackening element coated on the upper surface 110a. The blackening coating or paint can have dispersed colorant, such as carbon black, as well as other pigment or fillers that create uneven rough surface on curing or drying.

Figure 19:
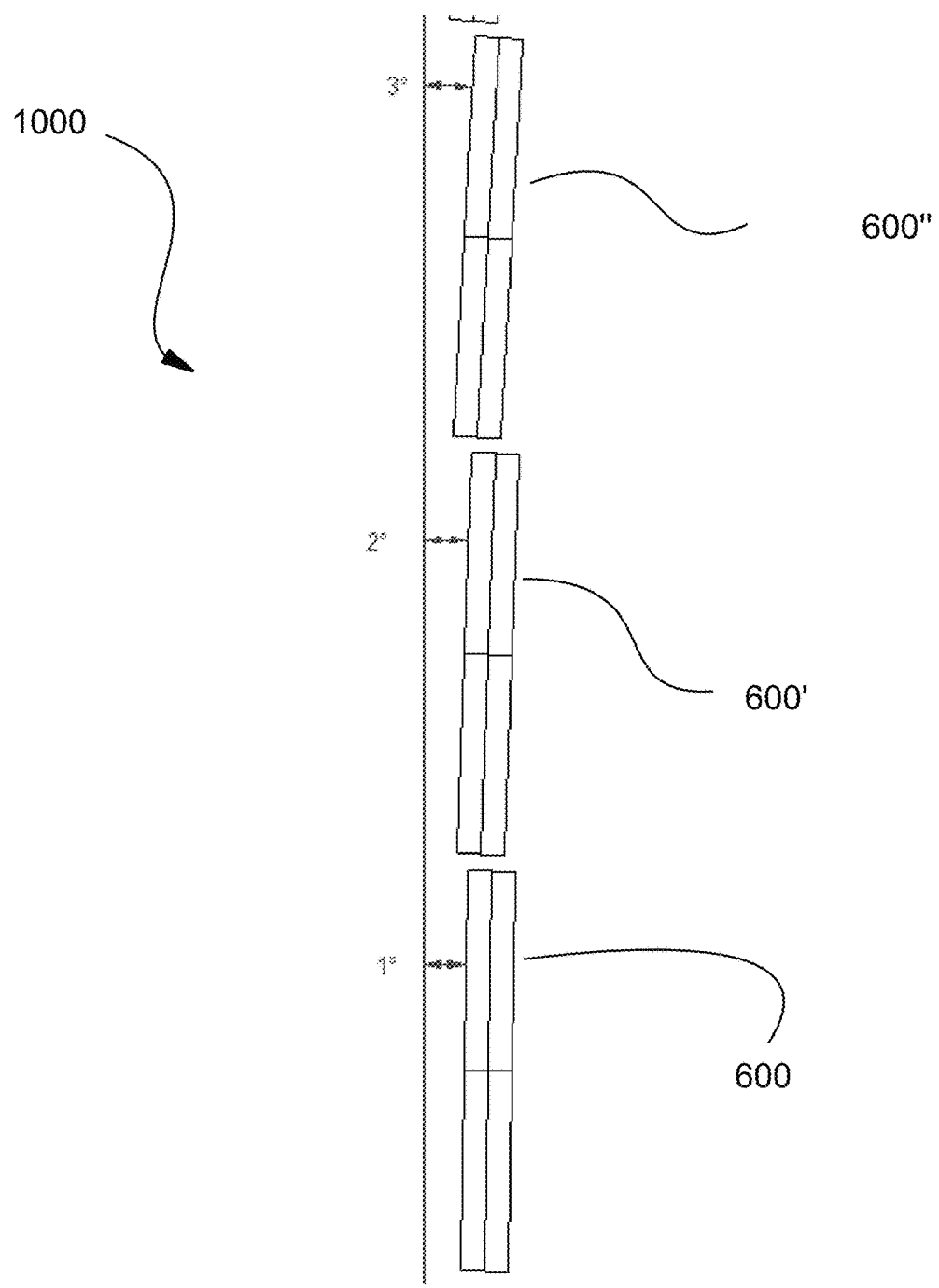
FIG. 19 is a cross-sectional elevation of a portion of a preferred embodiment of ganged louver assembly formed from light redirecting structure.

FIG. 19 illustrates a preferred embodiment of a ganged louvered structure in which the spreading of light is accomplished by mounting each louver 600 to have an approximately 1° relative tilt to the adjacent louver 600'. Accordingly, louver 600" is mounted with approximately 2° relative tilt with respect to louver 600, and so on along the louvered light re-directing structure 1000. This embodiment can deploy any of the optical elements 110 described with respect to the other embodiments of the slats 600. The louvers 600 can optionally deploy the light diffusing or partially angulated TIR surface disclosed in other embodiments. This example only illustrates 1° relative tilts, but is not limited to this increment.

More particularly, in the context of a light re-directing louver assembly comprising a plurality of louvers that are operatively coupled to be tilted, as in a ganged assembly for disposing the louver array opposite glazing each louver is preferably operative to provide a predetermined angular deviation of a main specular re-directed beam of incident light from other louvers in the array, and more preferably from the immediately adjacent louver.

In low diffraction, highly collimated optical assemblies of select embodiments of the instant invention, it is desirable to provide daylight across the ceiling extent and not just one tight location. When we lessen diffraction with macro optics, that is spacing apart the internal reflective surfaces or TIR surface by at least about 0.5 mm, we make the re-directed light beam tightly directional, which is improved by various embodiments of the invention.

A predetermined deviation by tilt deviation of optical design, for example, helps to meld together, or smoothes, the light distribution on a ceiling that looks choppy from small angular errors in louver manufacturing that make the ceiling light look non-uniform. In a more preferred aspect it can also spread the light across the extent of the interior ceiling to fill the room with daylight from front to back. When spreading the light across the entire depth of the room ceiling, it is also desirable that each louver spreads the light a sufficient amount to avoid the choppy appearance on the ceiling and overlap with the light distribution of the adjacent louver.

Hence, it is additionally preferred that light reflective surfaces of each louver are operative to increase the width of the main specular re-directed beam of incident light by at least any predetermined angular deviation of the main re-directed beam associated with each adjacent louver.

It should be appreciated that a preferred degree of increase in the width of the main specular re-directed beam of incident light by a predetermined angular deviation is dependent on room dimensions, and that such deviation should increase in proportion to the depth of the room orthogonal to the glazing surface.

In the case of a louver assembly that is ~2 feet high and placed perhaps 1 foot below a 10 foot ceiling height. The angular deviation, which can be accomplished by the tilt of the louver, to re-direct the light to the center of the ceiling in a 20 feet deep room, is 12 degrees. If the lowest louver is operative to provide the deepest penetration, which is 20 feet, the re-direction angle is 9 degrees. If we make the top louver re-direct a symmetric +3 degrees, we then cover most of the ceiling. Here the light is re-directed within a range of 9 degrees to 15 degrees.

Alternatively, one could deploy the top louver to re-direct the main beam at 18 degrees to provide a re-direction range 9 to 18 degrees, which is plus and minus 4.5 degrees, which would require only a +/−2.25 degree deviation in slope of the TIR surfaces within or between the upper and lower louver in the array.

When a room is 30 feet deep, the preferred deviation of the main specular re-directed beam of incident light is 6 degrees for the top louver and between about 11 degrees or 12 degrees for the bottom louvers, which is a range of 6 degrees, which is +/−3 degrees, and a corresponding slope range of +/−1.5 degrees for the reflective or TIR surfaces in the louvers.

However, to the extent the louver assembly is taller; the deviation of the main specular re-directed beam of incident light from the top and bottom louver can be reduced to cover the depth of the room. For example now with a 20 feet deep room and a louver assembly that is 3 feet tall, instead of 2 feet tall. The preferred re-direction angle of the top louver to the ceiling center is 14 degrees. The preferred re-direction angle of the bottom louver angle to the back of the ceiling is 11 degrees.

It is generally preferred to provide a light re-directing louver assembly comprising a plurality of louvers that are operatively coupled to be tilted, each louver comprising a generally rectangular planar support member having, an upper surface and a lower surface opposite the upper surface, an elongated front side on a side orthogonal to the plane of the upper surface, and an elongated back side opposed to and parallel with the front side, a right side on another side that is orthogonal to both the upper surface and the front side, and a left side opposite the front side that is parallel to the right side, a light redirecting structure that is at least one of attached to and disposed within the planar support member, the light redirecting structure comprising a plurality of spaced apart light reflective surfaces that terminate at corners, wherein the light reflecting surface thereof extend across the planar support member from the front side to the back side in which each light reflective surface faces the front or back side, wherein each louver is operative to provide a predetermined angular deviation of a main specular re-directed beam of incident light from that of the immediately adjacent louver. It is preferred to further that the light reflective surfaces of each louver are operative to increase the width of the main specular re-directed beam of incident light by at least said predetermined angular deviation. It is more predetermined that the angular deviation from an upper louver to a lower louver in the array is at least about 1 degree. It is additionally predetermined that the angular deviation is at least is at least about 2 degrees. It is most preferred that the predetermined that the predetermined angular deviation is at least about 4 degrees. In another aspect it is generally preferred that the light reflective surfaces of each louver are operative to increase the width of a main specular re-directed beam of incident light by at least the predetermined angular deviation that occurs between adjacent louvers. In another aspect it is more generally preferred that the light reflective surfaces of each louver are operative to increase the width of a main specular re-directed beam of incident light by at least twice the predetermined angular deviation that occurs between adjacent louvers.

Figure 20:
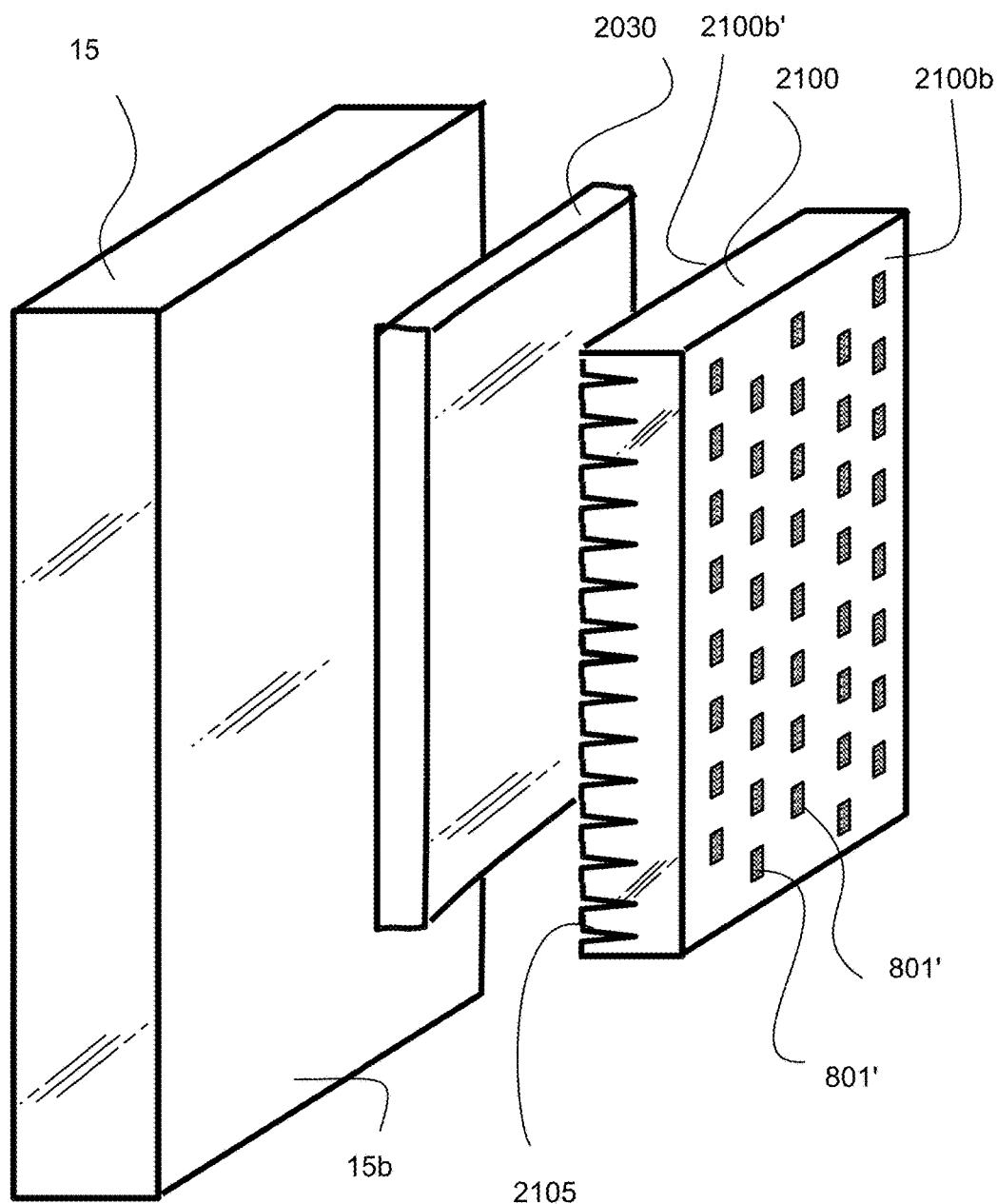
FIG. 20 is an exploded view of another embodiment of the invention in which a light re-directing film is adhered to glazing with an adhesive and the light re-directing film has an exterior pattern of light absorbing and or diffusing members.
Figure 21:
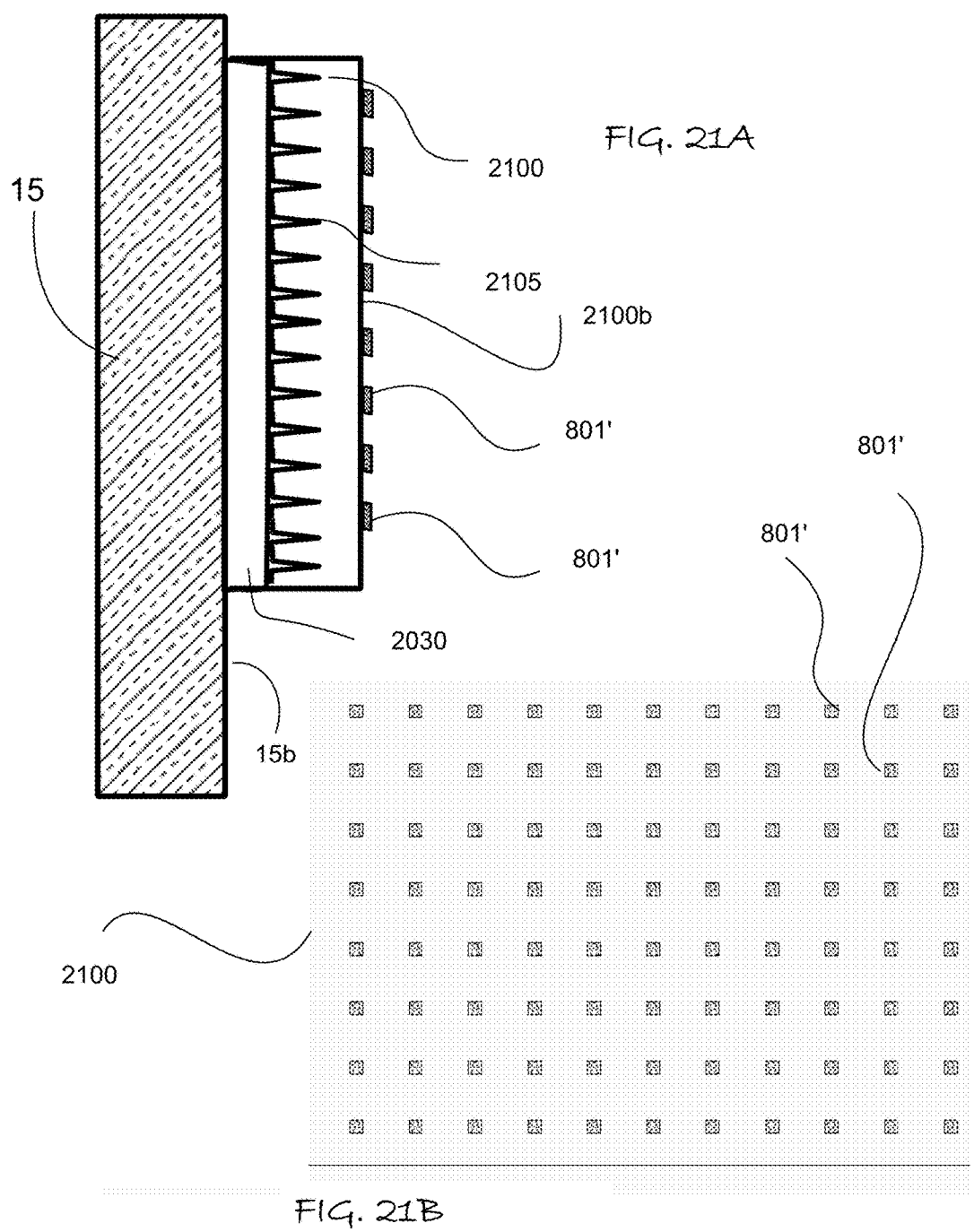

FIG. 20-21B illustrate another variant of the invention in which the patterned diffuser in FIG. 8B is applied to the exterior side of a light re-directing optical film or sheet 2100 that is monolithic or multi-layered (such as, without limitation, a UV cured resin layer with a texture on a monolithic substrate) and is applied to glazing surface 15 with an optical adhesive 2030. Optical film or sheet 2100, which has grooves 2105 that provide TIR surfaces on face 2100b', is adhered to glazing 15 on interior surface 15b' with optical adhesive 2030. The optical film or sheet 2100 may have grooves spaced apart by less than 0.5 mm, but more preferably less that about 0.25 mm to form a flexible film, or about equal to or greater than about 0.5 mm to reduce columnar glare and be less flexible, having a greater total thickness generally increasing in proportion to an increased groove spacing. The spaced apart grooves can be multifaceted, curves or slightly offset in angle with respect to adjacent groves in the film or sheet as disclosed in any of the other embodiment to provide the desired spreading of the specular re-directed light beam to accommodate deviations of louver tilt in the assembly 1000. Such spreading of the specular redirected light beam will also reduce columnar glare when the grooves are spaced apart by less than about 0.5 mm. Patterned elements 801' are disposed on the side 2100b of the optical film 2100 that is opposite the grooves 2105. As non-limiting examples, each patterned element 801' is optionally a 5 mm×5 mm and the spacing is about 20-25 mm in both directions, as shown in the elevation view in FIG. 21B. The pattern is intended to avoid a distracting appearance of minor defects in manufacturing and installation, without precluding see-through visibility. Note that the patterned elements 801' can be diffuse as well as transmit light and are optionally opaque or partially transparent and of any color. They can also have various shapes, such as circles, squares, rectangle, discrete polygons, or lines, which can be continuous or dashed.

It has also been discovered with respect to the illustration of FIGS. 21A and 21B that internal room ambiance can be improved when the patterned element 801' are provided to reduce contrast in directly lit work surfaces, where light leaks through the optical elements 2100 to produce very bright area, so that the effect of daylighting produces a more pleasing generally diffuse light effect, but without overhead lights. These benefits are achieved over preferred configurations of such elements 801' that do not adversely impair see through visibility for interior room occupants and provide an internal attenuation of incident light of about 10% to about 40%. Internal attenuation should be understood to mean the reduction in light transmission excluding the Fresnel reflection losses of circa 4-5% that occur at the front and rear external surfaces of louver 600 or other light redirecting structure. Such attenuation levels are preferably achieved when elements 801' are round dots disposed in columnar arrays with an offset of adjacent columns, such as in hexagonal array and having a diameter of between about 0.5 to 3 mm, but more preferably about 1 to 2 mm. Such elements 801' are preferably opaque to avoid creating and enhancing columnar glare from residual transmission at curved edges, but can have some transmission if they can be applied as a flat pattern. It has further been discovered that silk screen printing of such elements can provide the desirable flatness within the preferred size ranges of the printed element 801'.

It has been discovered that the grey to black colored elements 801' least interfere with the ability of building inhabitants to see outside at night, in contrast to white colored elements that overpower a dark background at night.

The grey to black color of elements 801' are also preferred as they do not change the external appearance of windows during the daytime.

Such partially transmissive elements 801' when printed very thin with a black ink composition have a grey appearance to internal viewers. This grey appearance can also be achieved using grey inks and printing opaque elements. As grey inks tend to be more transmissive and scattering than black inks, if grey inks are deployed, then elements 801' should have an optical density of at least about 1.3, but more preferably at least 1.5, and most preferably at least about 2.0. The most preferred embodiment of the elements appear grey to the internal and external viewer but are opaque without any transmissive scatter.

In such hexagonal arrays of elements 801' it is anticipated that the preferred round dots are spaced apart by about 1-10 mm, but more preferably about 2-8 mm, and most preferably about 3-7 mm. Non-limiting examples of such arrays are illustrated in elevation view in FIGS. 26B and 26C.

It should be appreciated that the optical elements 801' can also be applied regular and irregular patterns or flows, and provide the desired degree of attenuation with constant array dimensions or constant feature size.

Preferably, the optical elements 801' are opaque, with no transmissive scatter component. The scatter is undesirable as it increases glare in the window. We have found that inkjet printing optical element 801' is not optimal as the droplets form lenslets which scatter. Inkjet deposit of optical elements also suffers from low throughput, is high in cost and can also cause deleterious heating of the optical film 2100. Hence, optical elements 801' are preferably deposited on the optical film 2100 or glazing 15 by screen printing using UV-cured inks, as this results in the outstanding quality level ink deposit which is key to minimizing scatter (both transmissive and reflective) yet at high production throughput speeds. Further, screen printing can achieve the desired results in one printing step, as opposed to multiple passes/colors.

Figures 25A, 25B:
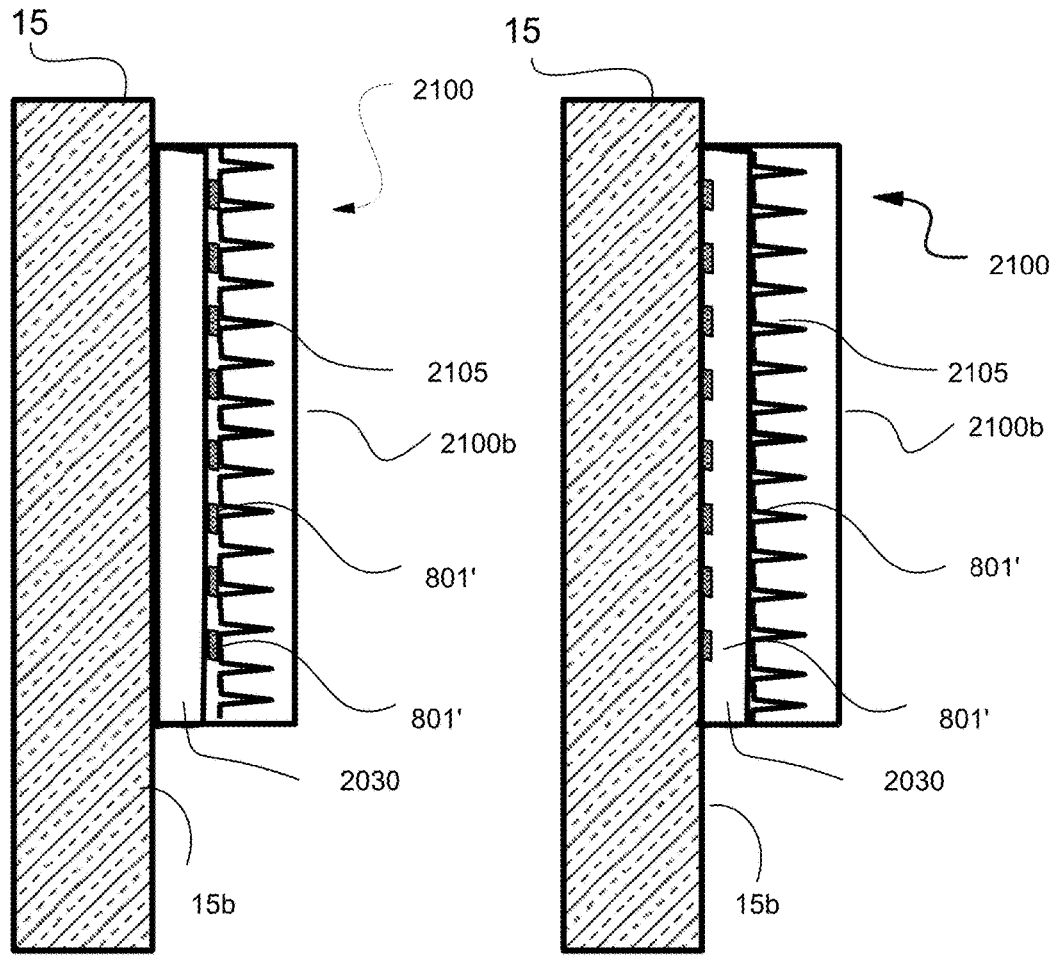
FIGS. 25A and 25B are alternative embodiments of FIG. 21A.

FIG. 25A shows elements 801' applied to the portion of the light re-directing film 2100 having the grooves 2105, with optical adhesive 2030 attaching the optical film 2100 to the interior surface 15*b*' of the glazing 15.

FIG. 25B shows elements 801' applied to the portion of the glazing 15 on interior surface 15*b*'. The optical adhesive 2030 is applied over the elements 801' and the intervening portion of the glazing interior surface 15*b*' for attaching the optical film 2100 to the interior surface 15*b*' of the glazing 15.

Figure 26A:
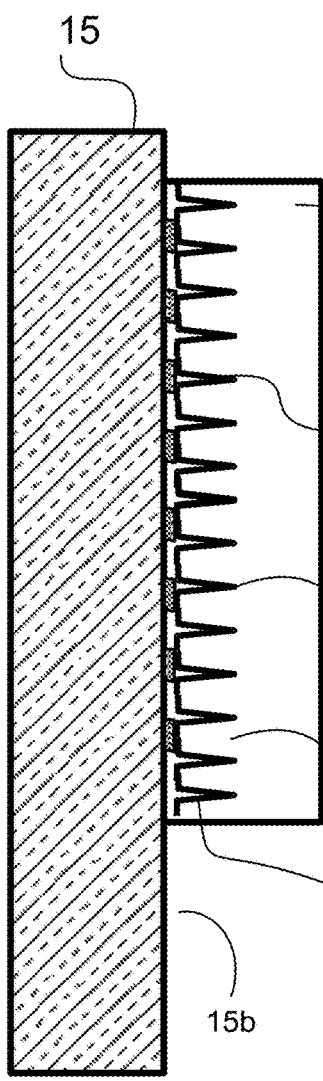
FIG. 26A is an alternative embodiment to FIGS. 21A, 25A and 25B, whereas FIGS. 26B and C are elevation views of representative optical element arrays shown in section view in FIGS. 21A, 25A, 25B and 26A.
Figure 26C:
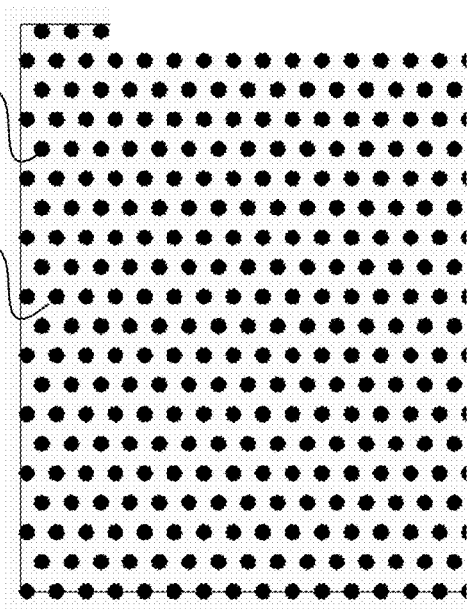
Figure 26B:
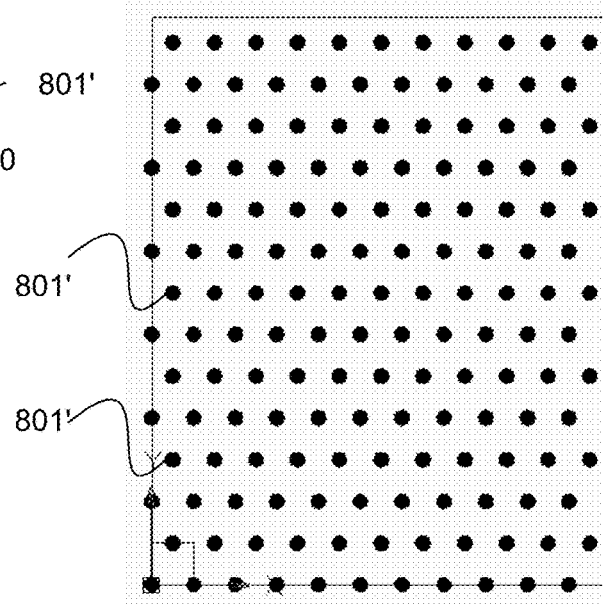

FIG. 26A shows the use of adhesive dots as opaque or high optical density optical elements 801'. The elements 801' are an adhesive material that both attaches the film 2100 to the interior surface 15*b*' of the glazing 15, performing the function of the optical adhesive 2030 in other embodiments. It should also be noted that as these adhesive optical elements 801' are disposed on the side of the grooves 2105 that provide TIR surfaces on face 2100*b*'

It should be appreciated that the embodiment of FIGS. 25A, B and 26A enclose the optical elements 801' between the glazing 15 and the film 2100, to prevent optical elements 801' from being damaged or worn off in window cleaning or other potential source of contact or abrasion to the window interior.

It should also be appreciated that any of the embodiments of FIG. 20-21B and FIG. 25A-26C can cover a portion of a plano glazing surface of window, or form louvers or slats 600.

Figures 23A, 23B:
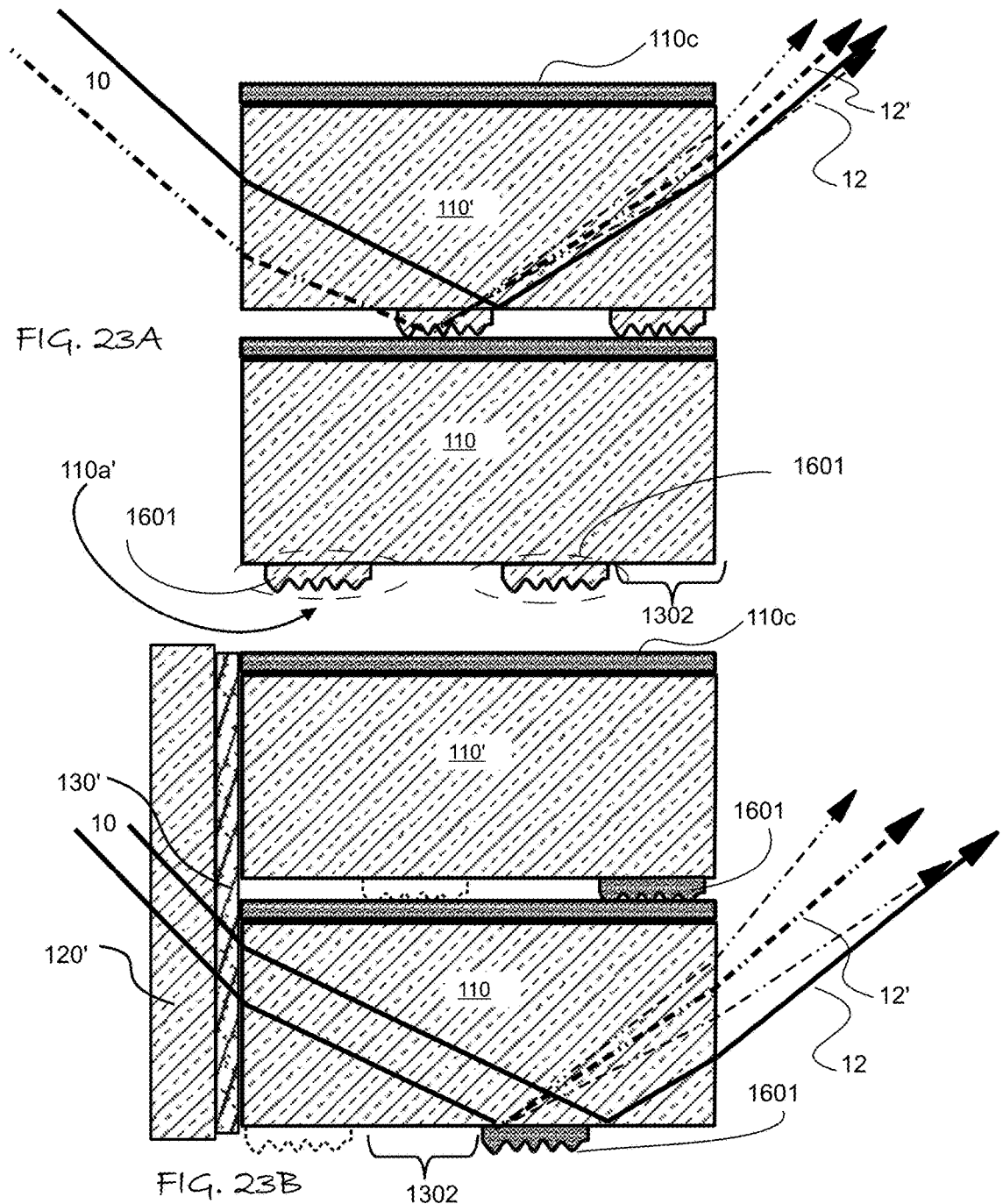

FIGS. 22, 23A and 23B illustrate an alternative method of forming the optical elements 110 of an embodiment in which only a portion 1302 of the TIR surface 110*a*' is planar, such as generally described in FIG. 13 in which regions 1301 and 1301' deviate from the planarity of an intervening portion 1302.

FIG. 22 shows an optical sheet 1400 in a plan view after printing a predetermined pattern of narrow diagonal stripes 2202 on an upper surface. The diagonal bias is with respect to the direction of cuts (shown by broken lines 2201) that are made to form the elongated optical elements 110. The optical sheet 1400 is intended to be formed into a plurality of the optical elements 110 shown stacked in FIGS. 23A and 23B.

The diagonal stripes 2202 can be made of a resin, such as a UV curable fluid, as well as paint or resin having fillers that is optimized to form a spacer 1601 between the assembled optical elements 110 shown in FIGS. 23A and 23B. Each spacer 1601 then also contributes to the spread of light from each slat 600 over the specular TIR reflection that occurs on the intervening portion 1302 of surface 110*a*'. Hence, the process described with respect to the embodiment of FIGS. 14A-C and 15A-B can be deployed to form a patterned region of stripes 2202 having the desired waviness in either 2 or 3 dimensions. Alternatively, the paint or curable fluid used to form stripes 2202 can be a commercial transparent non-gloss or semi gloss finish that scatters incident light. In this case, when the resulting optical elements 110 are stacked and attached to a common substrate such as 120' (optionally with adhesive layer 130') to form a slat 600 in FIG. 23B, TIR would still occur on the non-contacting portion 1302 between regions 1601. TIR would also occur on some portion of the striped regions 2022 that do not contact the adjacent optical element 110.

Alternatively, substrate 1400 is coated in the stripped portion 2202 with a paint, resin or curable fluid 1501 having dispersed filler particles 1502 (as previously described with respect to FIG. 15B) that are comparable in size to the thickness of the fluid to form a wavy surface pattern. However, the pattern will not need to be periodic as long as the mean repeat distance is much smaller than the width of the TIR surface 110*a*' and the surface slope is between about 1-4° as the anticipated benefit of spreading light from each slat 600 should be achieved. When the objective of the filler particles 1502 are simply to form the wavy surface pattern it may be preferable that they are transparent and non-scattering internally, as well as at the interface with the cured coating, by having the same index of refraction. However, it is also possible to use the filler 1502 to create a diffusing portion, in which case the filler should be one of internally scattering and having a different refractive index than the resin 1501. It is also possible to provide the desired spreading of the redirected light by any combination of the wavy surface with diffusion from the particles 1502. The portions 2202 can be applied in other patterns than stripes, such as irregular or regular patterns, including continuous and discontinuous lines, dots, rectangle and polygons by screen printing as well as other methods of depositing paints, resins and curable fluids. It should be appreciated that the wavy surface pattern also serves to separate optical elements 110 when stacked to provide spaces apart TIR surface.

FIG. 23A is intended to illustrate a close spacing of stripes 2202 that form 2 spacers 1601 in each cross-section of the optical elements 110' and 110. In contrast, FIG. 23B is intended to illustrate the opposite principles in which the spacers 1601 are more widely separated so each cross-section has only one spacer 1601, but the spacer is optionally more highly diffusing of incident ray 10 either from a greater variation in surface curvature on the wavy portion where TIR occurs, or from scatter within the spacer 1601 before and after TIR on the wavy portion. Highly scattering finishes can be applied as relatively narrow stripes with respect to the width of surfaces 110a and 110a' to provide sufficient spreading of the otherwise collimated specular reflection off portions 1302.

The higher the diffusing power of these spacers 1601 formed by stripes 2202, the lower total proportion of surface region 110a' they need to occupy. In either case, as the spacer 1601 is a small percentage of the total thickness of surface 110b, the diffusion therein and the angular spread of the TIR beam at surface 110a' will not affect see through visibility.

The bias angle, width and spacing of the stripes 2202 can provide at least 2 such spacers per optical surface 110a' to provide sufficient spreading of the otherwise highly collimated reflection from the TIR surface 110a'. However, this will depend on the level of light spreading or diffusion provided by the spaced regions 1601. The bias of the stripes with respect to the placement of the cuts 2201 for forming the elongated optical elements 110 is also selected to provide sufficient spacers 1601 per optical element 110 so that the faces 110a' are generally parallel and the louvers or slats 600 are generally rectangular with orthogonal adjacent sides when the optical elements 110 are stacked for assembly to faces 120 and 120'.

Figure 24:
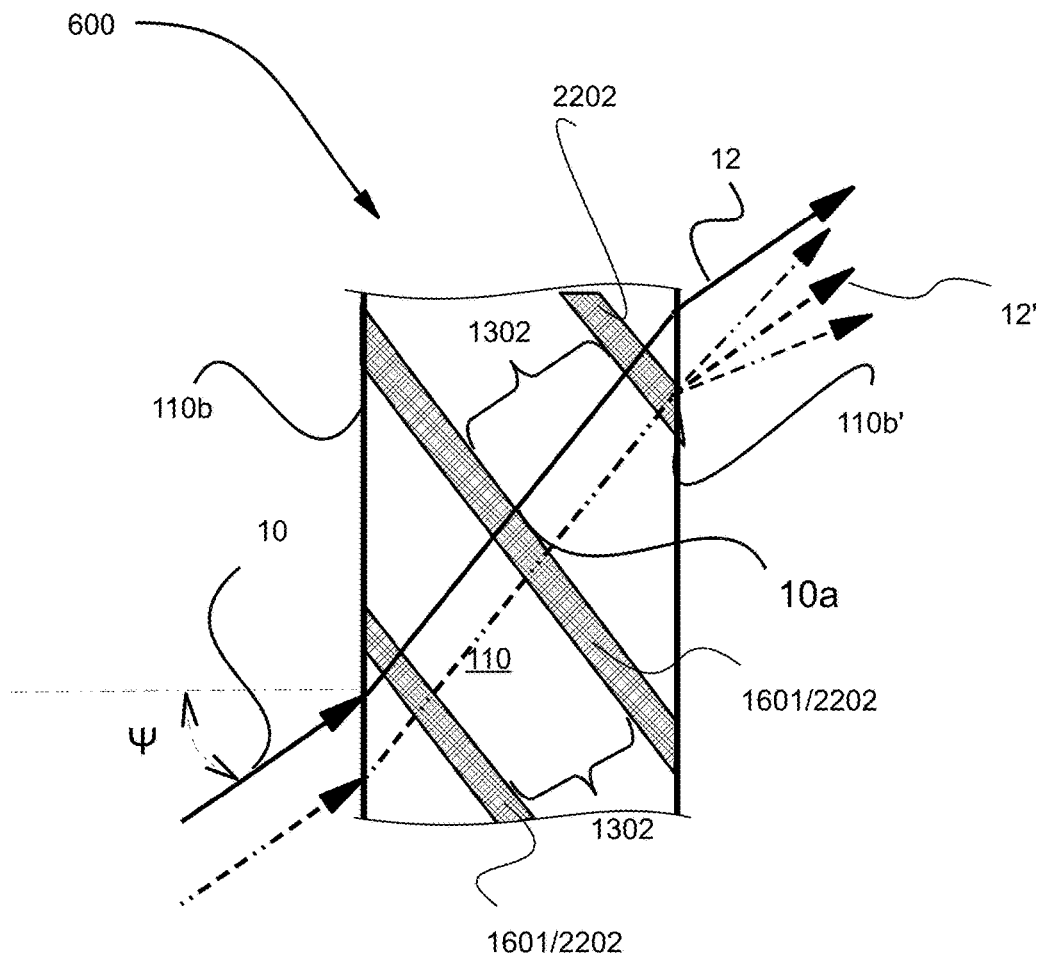
FIG. 24 shows a ray tracing of FIG. 23B in a top plan view.

FIG. 24 illustrates rays tracing in a plan view in slats 600 of FIGS. 23A and 23B at a high azimuthal angle (ψ) of incidence of ray 10 on glazing surface 15 the optical element 110, when the sun elevation is decreased. The optical element 110 has a specular reflective portion 1302 of the lower surface 110a' and the more diffusing spacers 1601, shown in elevation in FIGS. 23A and 23B. The rays 10 that are incident on portions 1302 are reflected and exit the element 110 as parallels rays 12. In contrast, rays 10 that enter spacer 1601 have a main reflected beam 12' shown as a broken line, but also a wider beam that results from scattering and/or TIR off slightly tilted surface, shown as the narrower broken lines on both sides of the ray 12'. FIGS. 23A and 23B show how the beam 12' has spread in the upward and downward direction, whereas FIG. 24 shows beam 12' also spreading in the lateral direction along the length of the optical element 110. Hence, either a wavy surface pattern or diffusion by light scattering in the spacers 1601 can also spread the light laterally along the slat 600 so that any recurring or periodic placement of the stripes 2202 within each optical element 110 of slat 600 does not form a discrete sub-patterns as the light is reflected toward the ceiling or a distant wall.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. A louver, comprising:
a) a generally rectangular planar support member having;
b) an upper surface and a lower surface opposite the upper surface,
c) an elongated front side on a side orthogonal to the plane of the upper surface, and an elongated back side opposed to and parallel with the front side,
d) a right side on another side that is orthogonal to both the upper surface and the front side, and a left side opposite the right side that is parallel to the right side,
e) a light redirecting structure that is at least one of attached to and disposed within the planar support member, the light redirecting structure comprising an array of spaced apart light reflective surfaces that terminate at corners, wherein the array extends across the planar support member from the front side to the back side in which each light reflective surface faces the front or back side, further comprising a pattern of light attenuating elements disposed on one of the upper surface and the lower surface to provide an internal attenuation of incident light of about 10% to about 40% and a further comprising a pattern of light attenuating elements disposed on one of the upper surface and the lower surface wherein the light attenuating elements are round dots disposed in columnar arrays with an offset of adjacent columns.

2. A louver, comprising:
a) a generally rectangular planar support member having,
b) an upper surface and a lower surface opposite the upper surface,
c) an elongated front side on a side orthogonal to the plane of the upper surface, and an elongated back side opposed to and parallel with the front side,
d) a right side on another side that is orthogonal to both the upper surface and the front side, and a left side opposite the right side that is parallel to the right side,
e) a light redirecting structure that is at least one of attached to and disposed within the planar support member, the light redirecting structure comprising an array of spaced apart light reflective surfaces that terminate at corners, wherein the array extends across the planar support member from the front side to the back side in which each light reflective surface faces the front or back side,
further comprising a pattern of light attenuating elements disposed on one of the upper surface and the lower surface to provide an internal attenuation of incident light of about 10% to about 40% and a pattern of light attenuating elements disposed on one of the upper surface and the lower surface wherein the light attenuating elements have a grey appearance.

3. A light re-directing louver assembly comprising a plurality of louvers that are operatively coupled to be tilted, each louver comprising:
a) a generally rectangular planar support member having;
   i) an upper surface and a lower surface opposite the upper surface,
   ii) an elongated front side on a side orthogonal to the plane of the upper surface, and an elongated back side opposed to and parallel with the front side,
   iii) a right side on another side that is orthogonal to both the upper surface and the front side, and a left side opposite the front side that is parallel to the right side,
   iv) a light redirecting structure that is at least one of attached to and disposed within the planar support member, the light redirecting structure comprising a plurality of spaced apart light reflective surfaces that terminate at corners, wherein the light reflecting surface thereof extend across the planar support member from the front side to the back side in which each light reflective surface faces the front or back side, b) wherein each louver is operative to provide a predetermined angular deviation of a main specular redirected beam of incident light from that of the immediately adjacent louver, wherein said predetermined angular deviation between an upper and lower louver in the array is at least about 1 degree.

4. The light re-directing louver assembly of claim 3 wherein said predetermined angular deviation between an upper and lower louver in the array is at least about 2 degrees.

5. The light re-directing louver assembly of claim 3 wherein said predetermined angular deviation between an upper and lower louver in the array is at least about 4 degrees.

6. The light re-directing louver assembly of claim 3 wherein the light reflective surfaces of each louver are operative to increase the width of a main specular redirected beam of incident light by at least twice the predetermined angular deviation.

* * * * *